(12) United States Patent
Kuroki et al.

(10) Patent No.: US 8,223,195 B2
(45) Date of Patent: Jul. 17, 2012

(54) THREE-DIMENSIONAL IMAGE PICKUP APPARATUS, THREE-DIMENSIONAL DISPLAY APPARATUS, THREE-DIMENSIONAL IMAGE PICKUP AND DISPLAY APPARATUS AND INFORMATION RECORDING METHOD

(75) Inventors: Yoshihiko Kuroki, Kanagawa (JP); Ko Ishimoto, Tokyo (JP); Atsushi Toda, Tokyo (JP)

(73) Assignee: Sony Corporation, Tokyo (JP)

( * ) Notice: Subject to any disclaimer, the term of this patent is extended or adjusted under 35 U.S.C. 154(b) by 1191 days.

(21) Appl. No.: 12/069,824

(22) Filed: Feb. 13, 2008

(65) Prior Publication Data

US 2008/0143824 A1 Jun. 19, 2008

Related U.S. Application Data

(62) Division of application No. 10/763,059, filed on Jan. 22, 2004, now abandoned.

(30) Foreign Application Priority Data

Jan. 22, 2003 (JP) ................ P2003-013193

(51) Int. Cl.
*H04N 13/04* (2006.01)
*G02B 26/00* (2006.01)
*G09G 3/00* (2006.01)

(52) U.S. Cl. ............... 348/51; 359/292; 345/31

(58) Field of Classification Search ......... 348/51; 359/292; 345/31
See application file for complete search history.

(56) References Cited

U.S. PATENT DOCUMENTS

| 4,492,442 A * | 1/1985 | Gaudyn ........................ 353/10 |
| 4,520,387 A * | 5/1985 | Cortellini ..................... 348/40 |
| 4,841,507 A * | 6/1989 | Imai et al. ................. 369/44.23 |
| 5,319,214 A * | 6/1994 | Gregory et al. ........... 250/504 R |
| 5,340,978 A * | 8/1994 | Rostoker et al. ........... 250/208.1 |
| 5,446,479 A * | 8/1995 | Thompson et al. ............. 345/6 |
| 5,652,666 A * | 7/1997 | Florence et al. ............. 359/22 |
| 5,734,490 A * | 3/1998 | Rabarot et al. ............ 359/210.1 |
| 5,920,361 A * | 7/1999 | Gibeau et al. .............. 348/750 |
| 6,014,164 A * | 1/2000 | Woodgate et al. ........... 348/51 |
| 6,084,697 A * | 7/2000 | Lebby et al. .............. 359/202.1 |
| 6,091,537 A * | 7/2000 | Sun et al. .................... 359/248 |
| 6,094,289 A * | 7/2000 | Moranski et al. .......... 359/223.1 |
| 6,118,124 A * | 9/2000 | Thundat et al. ............. 250/332 |
| 6,329,963 B1 * | 12/2001 | Chiabrera et al. ............. 345/6 |
| 6,400,490 B1 * | 6/2002 | Hosoi ........................ 359/254 |
| 6,415,068 B1 * | 7/2002 | Sun ............................. 385/16 |
| 6,483,641 B1 * | 11/2002 | MacAulay ................... 359/385 |
| 6,570,681 B1 * | 5/2003 | Favalora et al. ............. 359/17 |
| 6,614,581 B2 * | 9/2003 | Anderson ................... 359/295 |

(Continued)

*Primary Examiner* — Aung S Moe
*Assistant Examiner* — Chia-Wei A Chen
(74) *Attorney, Agent, or Firm* — Wolf, Greenfield & Sacks, P.C.

(57) ABSTRACT

A three-dimensional image pickup apparatus, a three-dimensional display apparatus and a three-dimensional image pickup and display apparatus are disclosed by which high-definition three-dimensional display from a plurality of eye points of different directions can be achieved by a simple apparatus configuration. The incoming directions and the intensities of a plurality of lights incoming from different directions to a light reception section are coordinated with each other for individual pixels to form video signals. A light emission section emits lights based on a coordinated relationship between the outgoing directions and the intensities of lights to be emitted therefrom for the individual pixels. The light incoming directions and the light outgoing directions are time-divisionally selected by means of light path selection elements, and a plurality of pixels are formed to pick up and display images having a parallax.

15 Claims, 18 Drawing Sheets

U.S. PATENT DOCUMENTS

| | | | |
|---|---|---|---|
| 6,795,241 B1 * | 9/2004 | Holzbach | 359/463 |
| 6,798,560 B2 * | 9/2004 | Aubuchon | 359/291 |
| 6,819,469 B1 * | 11/2004 | Koba | 359/290 |
| 6,825,968 B2 * | 11/2004 | Aubuchon | 359/290 |
| 6,865,346 B1 * | 3/2005 | Miller et al. | 398/135 |
| 6,912,090 B2 * | 6/2005 | Kornblit et al. | 359/619 |
| 6,947,571 B1 * | 9/2005 | Rhoads et al. | 382/100 |
| 6,987,571 B2 * | 1/2006 | Yamakawa et al. | 356/600 |
| 6,995,849 B2 * | 2/2006 | Uno et al. | 356/609 |
| 7,023,466 B2 * | 4/2006 | Favalora et al. | 348/42 |
| 7,048,384 B2 * | 5/2006 | Cole et al. | 353/94 |
| 7,238,957 B2 * | 7/2007 | Bailey | 250/504 R |
| 2002/0135673 A1 * | 9/2002 | Favalora et al. | 348/42 |
| 2003/0113012 A1 * | 6/2003 | Yoon | 382/154 |
| 2003/0156077 A1 * | 8/2003 | Balogh | 345/6 |
| 2004/0130649 A1 * | 7/2004 | Lee | 348/345 |
| 2007/0023851 A1 * | 2/2007 | Hartzell et al. | 257/414 |
| 2010/0067130 A1 * | 3/2010 | Kim et al. | 359/824 |

* cited by examiner

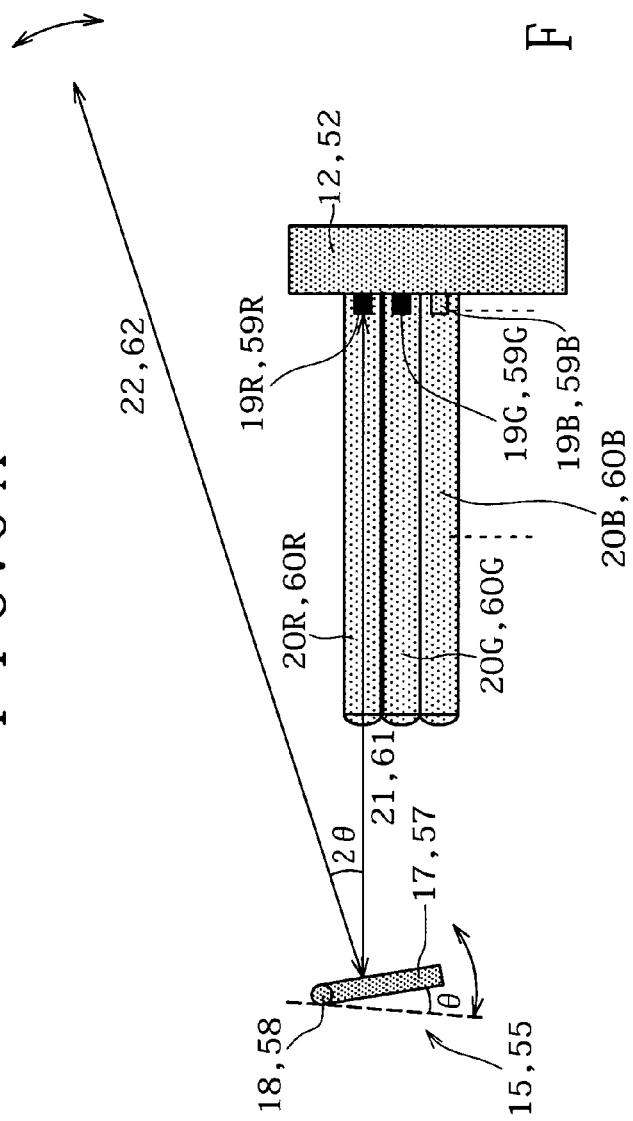
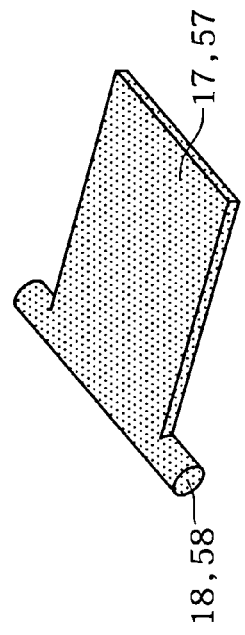
FIG. 5A
FIG. 5B $\theta 1 > \theta 2$

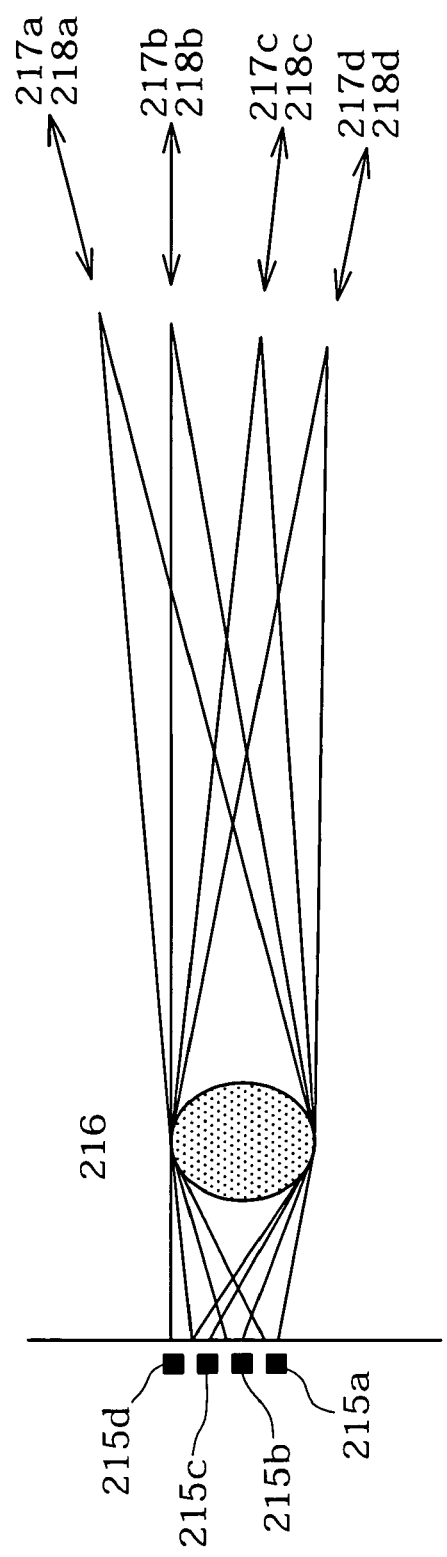

FIG. 18

REFRACTIVE INDEX OF PMMA USED FOR CALCULATION

| COLOR | BLUE | GREEN | RED |
|---|---|---|---|
| LIGHT RAY | F | e | C |
| WAVELENGTH (nm) | 486.13 | 546.07 | 656.27 |
| REFRACTIVE INDEX | 1.49776 | 1.49776 | 1.48920 |

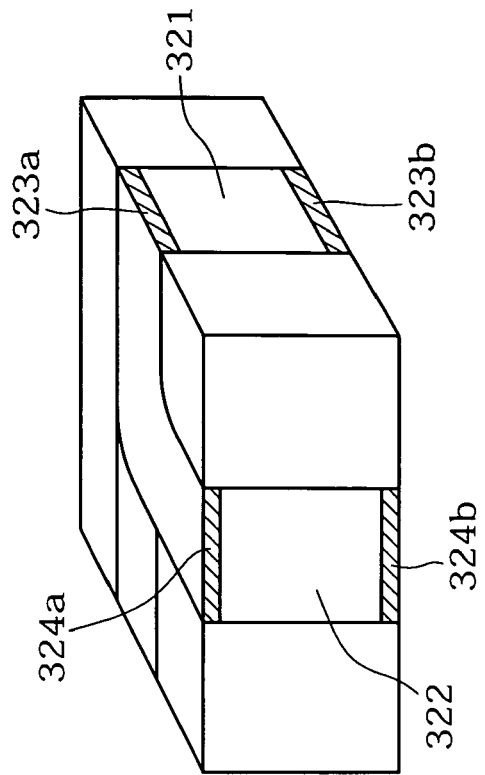
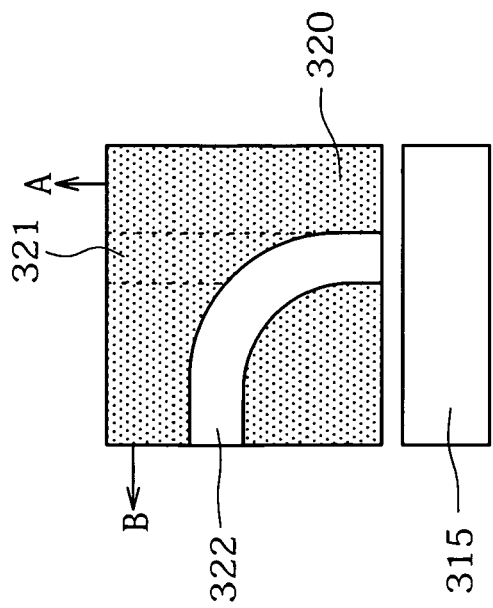

THREE-DIMENSIONAL IMAGE PICKUP APPARATUS, THREE-DIMENSIONAL DISPLAY APPARATUS, THREE-DIMENSIONAL IMAGE PICKUP AND DISPLAY APPARATUS AND INFORMATION RECORDING METHOD

CROSS REFERENCES TO RELATED APPLICATIONS

The present invention is a Divisional of U.S. application Ser. No. 10/763,059, filed Jan. 22, 2004, which, in turn, claims priority under 35 U.S.C. §119 to Japanese Patent Application No. JP 2003-013193, filed in the Japanese Patent Office on Jan. 22, 2003, the entire contents of which being incorporated herein by reference.

BACKGROUND OF THE INVENTION

This invention relates to a three-dimensional image pickup apparatus, a three-dimensional display apparatus, a three-dimensional image pickup and display apparatus and an information recording method for use to pick up and reproduce a three-dimensional image, and more particularly to a three-dimensional image pickup apparatus, a three-dimensional display apparatus, a three-dimensional image pickup and display apparatus and an information recording method for use to pick up a three-dimensional image in a plurality of directions from different eye points and reproduce the picked up three-dimensional image.

An apparatus which picks up a three-dimensional image is conventionally shown. According to the apparatus, two image of an image pickup object are picked up from different directions by means of a pair of light receiving elements disposed at positions corresponding to two eye points and then are visually observed by the left and right eyes of a viewer so that a parallax may be produced therebetween thereby to display a three-dimensional image. In order to cause the left and right eyes to recognize two different images from each other, a method is available wherein an image for the right eye and another image for the left are reproduced with lights having perpendicular polarization directions to each other while a viewer wears a polarizing lens so as to restrict the light to be admitted into one of the eyes. Also another method is available wherein a lenticular lens apparatus is disposed over an overall area of a display image to refract light for each pixel to select the displaying direction for an image for the right eye and the displaying direction for another image for the left eye.

However, since images corresponding to a parallax between two eye points are picked up and displayed, a viewer can recognize only a three-dimensional image of the image pickup object as viewed from the position set by the image pickup person, and therefore, the feeling of presence for three-dimensionally perceiving the display object is poor. Further, the method which uses a lenticular lens apparatus has a problem in that the position at which the viewer can visually observe the display three-dimensionally is restricted.

Thus, a display apparatus of the light ray reproduction type has been proposed by which, if the viewer changes its position with respect to the display apparatus, then the viewer can recognize light rays from different angles and therefore can visually observe a display object image from different angles. To this end, in the display apparatus, a plurality of incoming light rays from different directions are recorded for each display pixel, and recorded lights from the different directions are emitted in different directions to display the images.

A display apparatus of the light ray reproduction type is disclosed, for example, in Japanese Patent Laid-Open No. Hei 5-191838 (hereinafter referred to as Patent Document 1). In the display apparatus of the light ray reproduction apparatus, a plurality of light emitting elements for emitting light in different eye directions at a time are formed for each one pixel of an image display section for displaying an image. A pinhole apparatus which includes shutters is disposed in front of the image display section. Thus, changeover of the display is performed in synchronism with opening and closing operations of the shutters so that different light rays may be inputted to the left and right eyes through each one shutter so that the viewer may recognize images having a parallax thereby to display a three-dimensional image.

Another display apparatus of the light ray reproduction type is disclosed, for example, in Japanese Patent Laid-Open No. Hei 7-318858 (hereinafter referred to as Patent Document 2). In the display apparatus of the light ray reproduction apparatus, a light source array including a plurality of light sources is periodically oscillated in a perpendicular direction to the advancing direction of the light, and the light outgoing from the light source array is converted into parallel light by means of a lens. The advancing direction of the outgoing light is changed by a change of the relative positions of the light source array and the lens so that a discrete Fourier conversion image to be displayed by the light source array is changed in synchronism with the movement of the light source array thereby to cause the left and light eyes of the viewer to recognize different images from each other thereby to display a three-dimensional image.

According to the apparatus of the Patent Document 1 described hereinabove, however, it is necessary to form a number of display images corresponding to the number of eye points of different directions, and an excessively great number of display pixels are required in order to display a high-definition three-dimensional image. This increases the production cost for the display apparatus. Therefore, the apparatus of the Patent Document 1 is disadvantageous in that it is not suitable for high-definition three-dimensional display. Further, the number of display pixels which can be formed is physically limited by the size of the display apparatus. Also in this regard, the apparatus of the Patent Document 1 is disadvantageous in that it is not suitable for high-definition three-dimensional display.

Meanwhile, according to the apparatus of the Patent Document 2, since a discrete Fourier transform image to be displayed by the light source array is changed over in synchronism with a periodic oscillation of the light source array, an information processing apparatus which can perform information processing at a very high speed is required in order to achieve a three-dimensional image. Therefore, the apparatus of the Patent Document 2 is disadvantages in that the apparatus configuration is complicated.

SUMMARY OF THE INVENTION

It is an object of the present invention to provide a three-dimensional image pickup apparatus, a three-dimensional display apparatus and a three-dimensional image pickup and display apparatus by which high-definition three-dimensional display from a plurality of eye points of different directions can be achieved by a simple apparatus configuration.

In order to attain the object described above, according to an aspect of the present invention, there is provided a three-dimensional image pickup apparatus, comprising a plurality of light receiving elements for receiving and converting light into an electric signal, and a plurality of light path selection elements for selecting an incoming angle of light to come to the light receiving elements, the light receiving elements and the light path selection elements being arranged such that a plurality of pixels formed from the light receiving elements and the light path selection elements are disposed both in a row direction and a column direction, intensities of the light received by the light receiving elements and the incoming angles of light selected by the light path selection elements being recorded in a coordinated relationship for the individual pixels.

In the three-dimensional image pickup apparatus, since the intensities of the light received by the light receiving elements and the incoming angles of light selected by the light path selection elements are recorded in a coordinated relationship for the individual pixels, incoming lights from different directions can be recorded. Since formation of a plurality of pixels provides a parallax with regard to the same subject, a three-dimensional image can be picked up by recording a plurality of incoming lights from different directions.

According to another aspect of the present invention, there is provided a three-dimensional image pickup apparatus, comprising light intensity acquisition means for acquiring intensity information of received light, and incoming angle acquisition means for acquiring incoming angle information of the received light, the intensity information and the incoming angle information of the light being recorded in a coordinated relationship with each other.

According to a further aspect of the present invention, there is provided a three-dimensional display apparatus, comprising a plurality of light emitting elements for emitting light in accordance with an electric signal, and a plurality of light path selection elements for selecting an outgoing angle of light to be emitted from the light emitting elements, the light emitting elements and the light path selection elements being arranged such that a plurality of pixels formed from the light emitting elements and the light path selection elements are disposed both in a row direction and a column direction, the light emitting elements emitting light in accordance with a coordinated relationship between the outgoing angles of light selected by the light path selection elements and the intensities of light for the individual pixels.

In the three-dimensional image pickup apparatus, since the light emitting elements emit light in accordance with a coordinated relationship between the outgoing angles of light selected by the light path selection elements and the intensities of light for the individual pixels, lights can be emitted from the light emitting elements to different directions for the individual pixels. Since formation of a plurality of pixels provides a parallax with regard to the same subject, a three-dimensional image can be displayed by displaying a plurality of outgoing lights to different directions. Since the viewer visually observes, at a different position, different displays having a parallax, different three-dimensional displays can be recognized from different directions.

According to a still further aspect of the present invention, there is provided a three-dimensional display apparatus, comprising light emission means for emitting light based on intensity information of light, and outgoing angle selection means for selecting an outgoing angle of light to be emitted from the light emission means, the light emission means emitting light in response to a coordinated relationship between the outgoing angle of light and the intensity information of light.

According to a yet further aspect of the present invention, there is provided a three-dimensional image pickup and display apparatus, comprising a light reception section including a plurality of light receiving elements for receiving and converting light into an electric signal and a plurality of first light path selection elements for selecting an incoming angle of light to come to the light receiving elements, the light receiving elements and the first light path selection elements being arranged such that a plurality of pixels formed from the light receiving elements and the first light path selection elements are disposed both in a row direction and a column direction, intensities of the light received by the light receiving elements and the incoming angles of light selected by the first light path selection elements being coordinated with each other for the individual pixels to form video signals, and a light emission section including a plurality of light emitting elements for emitting light in accordance with an electric signal and a plurality of second light path selection elements for selecting an outgoing angle of light to be emitted from the light emitting elements, the light emitting elements and the second light path selection elements being arranged such that a plurality of pixels formed from the light emitting elements and the second light path selection elements are disposed both in a row direction and a column direction, the light emitting elements emitting light in accordance with a coordinated relationship between the outgoing angles of light selected by the second light path selection elements and the intensities of light for the individual pixels based on the video signals.

In the three-dimensional image pickup and display apparatus, the intensities of light and the incoming angles of light are coordinated with each other for the individual pixels to form video signals, and light is emitted in accordance with the coordinated relationship between the intensities of light and the outgoing angles of light for the individual pixels based on the video signals. Therefore, it is possible to pick up incoming lights from different directions as an image by means of the light reception section and display them as outgoing lights in different directions by means of the light emission section. Since formation of a plurality of pixels provides a parallax with regard to the same subject, a three-dimensional image can be picked up and displayed by emitting a plurality of outgoing lights by means of the light emission section based on a plurality of incoming lights from different directions to the light reception section.

According to an additional aspect of the present invention, there is provided an information recording method, comprising the steps of acquiring intensity information of received light, acquiring incoming angle information of the received light, and recording the intensity information and the incoming angle information of the light in a coordinated relationship with each other.

In summary, with the three-dimensional image pickup apparatus, three-dimensional display apparatus and three-dimensional image pickup and display apparatus as well as information recording method, appreciation of a spatial image which provides the feeling of presence and visual communication are achieved by a mechanism for time-divisionally recording and reproducing the directions and the intensities of a plurality of light rays passing through each of pixels.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 5A and 5B are schematic views showing a detailed structure of a reflecting element and a light receiving element which form a pixel and time-divisional reception of a plurality of incoming lights from different directions in the three-dimensional image pickup apparatus of FIG. 3;

FIG. 16 is a diagrammatic view illustrating a concept of a change in relative positional relationship between the microlens apparatus and light receiving and emitting elements and changes of the incoming path and the outgoing path in the three-dimensional image pickup and display apparatus of FIG. 14;

FIG. 18 is a table illustrating refraction indices of PMMA (polymethyl methacrylate, acrylic resin) materials used as a material for the microlens apparatus shown in FIG. 14;

FIGS. 20A and 20B are schematic views schematically showing the structure of a liquid crystal light path selection element and illustrating light path selection in the three-dimensional image pickup and display apparatus of FIG. 19;

DESCRIPTION OF THE PREFERRED EMBODIMENTS

First Embodiment

In the following, a three-dimensional image pickup apparatus, a three-dimensional display apparatus and a driving method for them to which the present invention is applied are described. According to a first embodiment of the present invention described below, a three-dimensional image pickup apparatus and a three-dimensional display apparatus are prepared separately from each other, and a plurality of different lights received time-divisionally by the three-dimensional image pickup apparatus are emitted time-divisionally in different directions by the three-dimensionally display apparatus.

Figure 1:
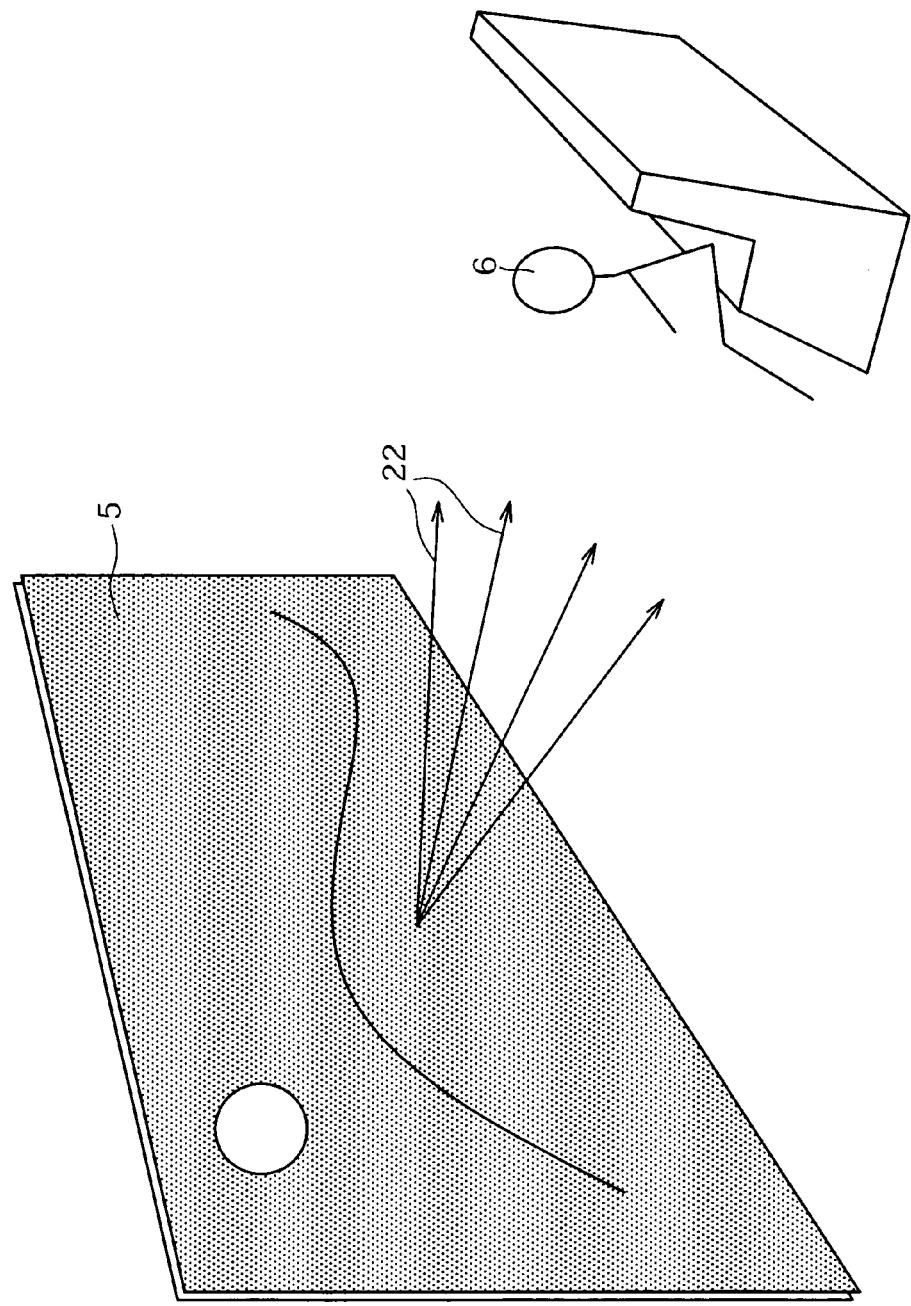
FIG. 1 is a schematic view illustrating a manner wherein an image displayed by a three-dimensional display apparatus is observed by a viewer.

FIG. 1 illustrates a manner wherein a viewer visually observes a three-dimensional image using the three-dimensional display apparatus of the present invention. Referring to FIG. 1, the viewer 6 sees in a direction to a screen of a three-dimensional display apparatus 5 to see outgoing lights 22 going out from the three-dimensional display apparatus 5. The three-dimensional display apparatus 5 changes the outgoing direction of light in accordance with the passage of time and displays display contents associated with the outgoing direction. Therefore, different images are displayed in different directions. Consequently, if the viewer 6 changes the relative position thereof to the three-dimensional display apparatus 5, then it visually observes a different image. The reason why the image visually observed by the viewer 6 is perceived as a three-dimensional image and besides is perceived as a different three-dimensional image where the viewer views from a different direction is described below.

Figure 2:
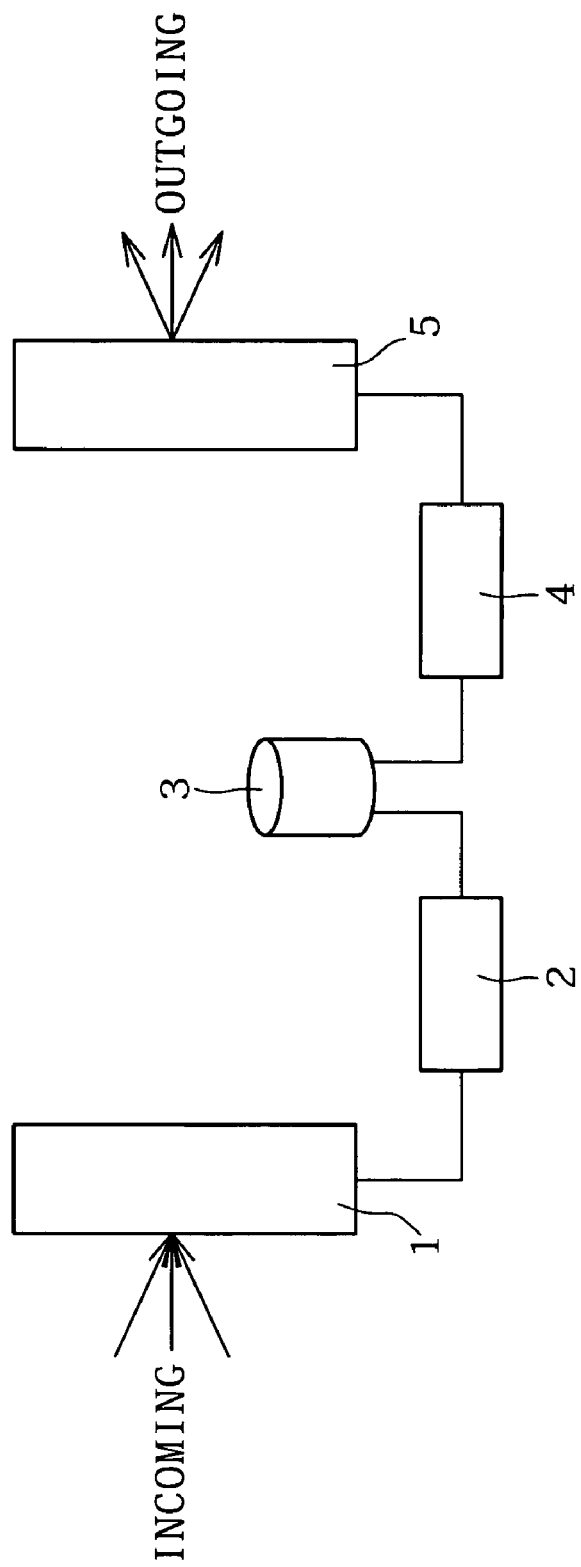
FIG. 2 is a block diagram illustrating a configuration for performing three-dimensional image pickup and display using a three-dimensional image pickup apparatus and a three-dimensional display apparatus to which the present invention is applied.

FIG. 2 shows a configuration where three-dimensional image pickup and display are performed using the three-dimensional image pickup apparatus and the three-dimensional display apparatus of the present invention. Referring to FIG. 2, a three-dimensional image pickup apparatus 1, an information processing module 2, a recording apparatus 3, another information processing module 4 and a three-dimensional display apparatus 5 are connected to each other for information exchange. Thus, the three-dimensional image pickup apparatus 1 picks up an image of a subject, and the three-dimensional display apparatus 5 displays the subject.

The three-dimensional image pickup apparatus 1 includes a plurality of pixels each formed from a plurality of light receiving elements arranged suitably. The three-dimensional image pickup apparatus 1 time-divisionally converts a plurality of lights incoming from different directions into electric signals representative of the intensities of the incoming lights and the coordinated incoming directions of the incoming lights for each pixel and transmits the electric signals to the information processing module 2. The information processing module 2 serves as an information processing apparatus for converting the received lights from the different directions into video signals. In particular, the information processing module 2 performs amplification, digitization, data compression and other necessary processes for the electric signals of the incoming lights transmitted thereto from the three-dimensional image pickup apparatus 1 to produce video signals. The information processing module 2 transmits the video signals to the recording apparatus 3 or the information processing module 4.

The recording apparatus 3 is provided to record and retain the video signal for a predetermined period of time and may be, for example, a memory which is a semiconductor storage device which records information electrically, a magnetic disk or a magnetic tape which is a magnetic recording apparatus which records information magnetically, an apparatus which records information optically, or the like. The information processing module 4 serves as an information processing apparatus which converts a video signal transmitted thereto from the recording apparatus 3 or the information processing module 2 into an electric signal. In particular, the information processing module 4 performs amplification, conversion into analog data, data decompression and so forth for the video signal to produce an electric signal and transmits the electric signal to the three-dimensional display apparatus 5.

The three-dimensional display apparatus 5 includes a plurality of pixels each formed from a plurality of light emitting elements arranged suitably. The three-dimensional display apparatus 5 time-divisionally selects the outgoing directions of lights in a coordinated relationship with the incoming directions of the incoming lights for the individual pixels based on electric signals transmitted thereto from the information processing module 4 so as to display lights to be emitted in a plurality of directions.

Figure 3:
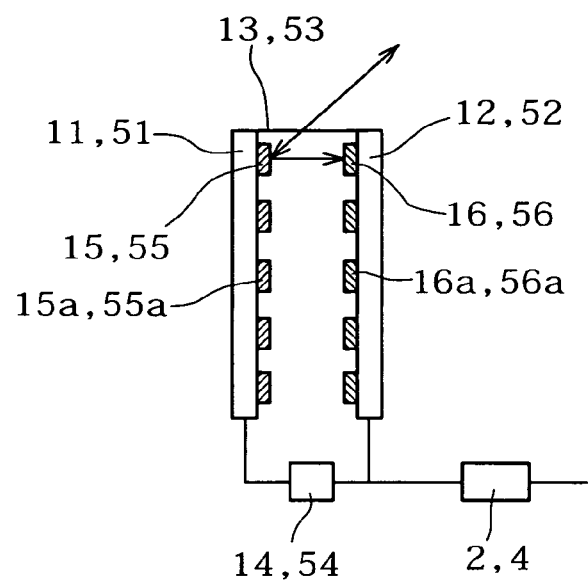
FIG. 3 is a schematic view showing a structure of the three-dimensional image pickup apparatus.

FIG. 3 schematically shows a structure of the three-dimensional image pickup apparatus 1 according to the present embodiment. Referring to FIG. 3, the three-dimensional image pickup apparatus 1 includes a reflection section 11 and a light reception section 12 disposed in an opposing relationship to each other. A light incoming opening 13 for taking in light from the outside therethrough is formed above the reflection section 11 and the light reception section 12. The three-dimensional image pickup apparatus 1 further includes a synchronous control circuit 14 for synthesizing operation of the reflection section 11 and operation of the light reception section 12 with each other.

The reflection section 11 includes a circuit board on which electric wiring (not shown) is formed. A plurality of reflecting elements 15 are arranged in row and column directions on a face of the reflection section 11 adjacent the light reception section 12 and reflect external light incoming through the light incoming opening 13 toward the light reception section 12. Each of the reflecting elements 15 is connected to the synchronous control circuit 14 through the electric wiring formed on the reflection section 11 and changes the reflection direction of the incoming light in accordance with a control signal supplied thereto from the synchronous control circuit 14.

The light reception section 12 includes a circuit board on which electric wiring (not shown) is formed. A plurality of light receiving elements 16 are arranged in row and column directions on a face of the light reception section 12 adjacent the reflection section 11. Each of the light receiving elements 16 receives external light reflected by one of the reflecting elements 15 and converts the received external light into an electric signal in accordance with the intensity of the received light. Each of the light receiving elements 16 is connected to the synchronous control circuit 14 through the electric wiring formed on the light reception section 12, converts the received light into an electric signal by which the intensity of light and the incoming direction of the light are coordinated with each other for each pixel, and transmits the signal to the synchronous control circuit 14.

One pixel is formed from a single reflecting element 15$a$ and light receiving elements 16$a$ for receiving reflected light from the reflecting element 15$a$. Thus, a plurality of pixels are formed from the reflecting elements 15 arrayed on the reflection section 11 and the light receiving elements 16 arrayed on the light reception section 12.

The light incoming opening 13 is an opening for taking in light from the outside of the three-dimensional image pickup apparatus 1 therethrough. The light incoming opening 13 may be formed from any material which passes light therethrough such as glass or a plastic material only if it is possible to take in external light to the reflection section 11 therethrough. Or, a lens or a prism may be used in order to take in external light efficiently over a wide range therethrough.

The synchronous control circuit 14 controls operation of all of the individual reflecting elements 15 arrayed on the reflection section 11. The synchronous control circuit 14 receives electric signals of incoming light converted individually by all of the light receiving elements 16 arrayed on the light reception section 12 and transmits the electric signals from the light receiving elements 16 in a coordinated relationship with the operation situations of the reflecting elements 15 to the information processing module 2. In other words, the synchronous control circuit 14 transmits the electric signals of the light receiving elements 16 in a coordinated relationship with the operation situations of the reflecting elements 15 which form the pixels to notify the information processing module 2 of the operation situations of all pixels and the electric signals to drive and control the reflection section 11 and the light reception section 12 in synchronism with each other.

Now, a detailed structure of the reflecting elements 15 and the light receiving elements 16 which form the pixels and time-divisional reception of a plurality of incoming lights from different directions are described with reference to FIGS. 5A and 5B. FIG. 5A illustrates one pixel formed from a combination of a reflecting element 15 and a light receiving element 16 while FIG. 5B shows a structure of the reflecting element 15 in a perspective view.

The reflecting element 15 includes a mirror plate 17 having a flat face for reflecting light and a pivot shaft 18 in the form of a rod-like shaft formed along a side of the mirror plate 17. The pivot shaft 18 is supported for pivotal motion, and when electrostatic force, magnetic force, piezoelectric force or like force is applied to the mirror plate 17, the mirror plate 17 is pivoted around an axis of the pivot shaft 18. The mirror plate 17 may be replaced by another reflecting element such as a MEMS (Micro-Electro-Mechanical Systems) element or a digital micromirror device (DMD) (trade name).

The light receiving element 16 includes light emitting diodes 19R, 19G and 19B corresponding to the wavelengths of lights of red (R), green (G) and blue (B) and disposed on the light reception section 12, and light guides 20R, 20G and 20B mounted on the light emitting diodes 19R, 19G and 19B, respectively. The light emitting diodes 19R, 19G and 19B are connected to the electric wiring formed on the light reception section 12 such that electric signals each in the form of a potential difference appearing between terminals when light is received are transmitted to the synchronous control circuit 14. While the light emitting diodes 19R, 19G and 19B are indicated as elements which receive and convert light into electric signals, an element of a different type may be used instead if such a potential difference as mentioned above is produced upon reception of light. Further, while it is described that the light guides 20R, 20G and 20B are mounted on the light emitting diodes 19R, 19G and 19B for red, green and blue, respectively, alternatively a single light guide may be mounted for one set of light emitting diodes 19R, 19G and 19B.

Now, a path of light is described using an example wherein light reflected by the mirror plate 17 arrives at the light emitting diode 19R through the light guide 20R. However, the description similarly applies also to the light guides 20G and 20B and the light emitting diodes 19G and 19B. The light guide 20R is a post-shaped light guide formed from an optical fiber or a like element and has a function of introducing light incoming from an end face to the opposite end face thereof without admitting light from a side face of the light guide 20R. The light guide 20R is attached at one end thereof to the light emitting diode 19R and has the other end disposed in an opposing relationship to the reflecting elements 15. Therefore, since the light guide 20R functions as a light guide path, light which can arrive at the light emitting diode 19R is limited only to light transmitted in a direction from the reflecting elements 15.

Where the path of light received by the light emitting diode 19R from the reflecting elements 15 is a reception light path 21 and the angle defined by a plane perpendicular to the reception light path 21 and the mirror plate 17 is a reflection angle $\theta$ while the path along which light incoming from the light incoming opening 13 arrives at the light emitting diode 19R is an incoming path 22, then the angle defined by the reception light path 21 and the incoming path 22 is $2\theta$.

Accordingly, if the reflection angle $\theta$ successively changes to $\theta_1, \theta_2, \theta_3, \ldots, \theta_n$ when the time t successively passes to $t_1, t_2, t_3, \ldots, t_n$ while the mirror plate 17 is driven to pivot around the pivot shaft 18, then the light arriving at the light emitting diode 19R successively changes to lights from directions where the angles defined by the reception light path 21 and the incoming path 22 are $2\theta_1, 2\theta_2, 2\theta_3, \ldots, 2\theta_n$, respectively. In short, the lights incoming from different directions are received and converted into electric signals by the light emitting diode 19R as time passes. Such a change of the direction of the incoming light as time passes is hereinafter referred to as time-divisional change of the image pickup direction. Further, since the path of the incoming light changes as the reflecting element 15 is driven to change the reflection angle $\theta$, the reflecting element 15 functions as a light path selection element for selecting the path of light reception.

Figure 4:
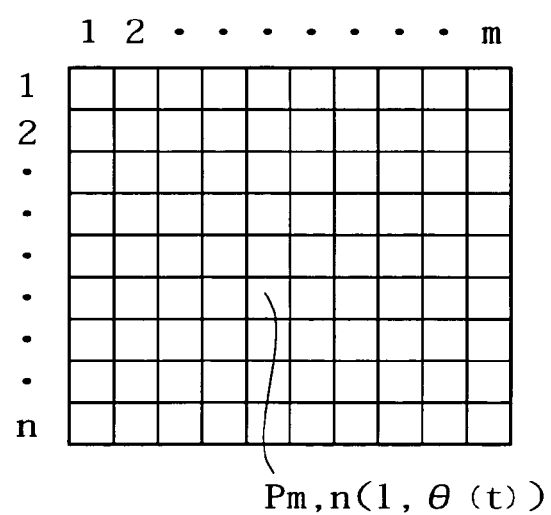
FIG. 4 is a diagrammatic view illustrating pixels of a screen of the three-dimensional image pickup apparatus of FIG. 3 and electric signals to be acquired by the pixels.

FIG. 4 illustrates a concept of a plurality of pixels arranged in row and column directions and time-divisional electric signals acquired for individual pixels. The pixels each formed from a reflecting element 15a and a light receiving element 16a cooperatively form a screen wherein m pixels are arranged in the direction of a row and n pixels are arranged in the direction of a column. The direction $\theta(t)$ of the incoming light and the intensity I(t) of the light are coordinated with each other to form an electric signal $P_{m,n}(I(t), \theta(t))$ for each pixel as time passes. Since the synchronous control circuit 14 receives an electric signal of light received by the light receiving element 16 in an associated relationship with the driving control of the reflecting element 15, the circuit 14 transmits the time t, reflection angle $\theta$, pixel position and electric signal with regard to all of the pixels each formed from the combination of a reflecting element 15 and a light receiving element 16 in a coordinated relationship with each other to the information processing module 2. Accordingly, the received lights in the image pickup direction which time-divisionally vary with regard to all pixels are transmitted as electric signals to the information processing module 2.

The information processing module 2 performs various processes such as amplification, digitization and data compression for a received electric signal to convert the electric signal into a video signal and transmits the video signal to the recording apparatus 3, and the recording apparatus 3 records the video signal. The recorded video signal is read out by the information processing module 4. The information processing module 4 performs necessary process such as amplification, conversion into analog data and data decompression for the read out video signal to convert the video signal into an electric signal. The information processing module 4 transmits such electric signals obtained by the conversion as time passes to the three-dimensional display apparatus 5, and the three-dimensional display apparatus 5 time-divisionally varies the displaying direction to perform three-dimensional display in a plurality of directions.

The three-dimensional display apparatus 5 has a structure similar to that of the three-dimensional image pickup apparatus 1. Therefore, the structure of the three-dimensional display apparatus 5 is described with reference to FIG. 3. The three-dimensional display apparatus 5 includes a reflection section 51, a light emission section 52 disposed in an opposing relationship to each other, and a light outgoing opening 53 formed above the reflection section 51 and the light emission section 52 for emitting light to the outside therethrough. The three-dimensional display apparatus 5 further includes a synchronous control circuit 54 for synthesizing operation of the reflection section 51 and operation of the light emission section 52 with each other.

The reflection section 51 includes a circuit board on which electric wiring (not shown) is formed. A plurality of reflecting elements 55 are disposed in row and column directions on a face of the reflection section 51 adjacent the light emission section 52 and reflect light emitted from the light emission section 52 to the outside through the light outgoing opening 53. Each of the reflecting elements 55 is connected to the synchronous control circuit 54 through the electric wiring formed on the reflection section 51 and changes the reflection direction of the outgoing light in accordance with a control signal supplied thereto from the synchronous control circuit 54.

The light emission section 52 includes a circuit board on which electric wiring (not shown) is formed. A plurality of light emitting elements 56 are disposed in row and column directions on a face of the light emission section 52 adjacent the reflection section 51. Each of the light emitting elements 56 is connected to the synchronous control circuit 54 through the electric wiring formed on the light emission section 52 and emits light in accordance with an electric signal supplied thereto from the synchronous control circuit 54.

One pixel is formed from a combination of a single light emitting element 56a and a reflecting element 55a for reflecting light emitted from the light emitting element 56a. A plurality of pixels are formed from combinations of the reflecting elements 55 disposed on the reflection section 51 and the light emitting elements 56 disposed on the light emission section 52.

The light outgoing opening 53 is an opening member for taking out light to the outside of the three-dimensional display apparatus 5 and may be formed from a material which passes light therethrough such as a glass or plastic material only if it can pass light from the reflection section 51 to the outside therethrough. A lens or a prism may be used in order to emit light efficiently to the outside over a wide range therethrough.

The synchronous control circuit 54 controls operation of all of the individual reflecting elements 55 disposed on the reflection section 51. Thus, the synchronous control circuit 54 transmits electric signals of outgoing lights emitted individually by all of the light emitting elements 56 disposed on the light emission section 52 and receives electric signals to the light emitting elements 56 coordinated with operation situations of the reflecting elements 55 from the information processing module 4. In short, the synchronous control circuit 54 coordinates the operation situations of the reflecting elements 55 which form the pixels and the electric signals of the light emitting elements 56 with each other to drive and control the reflection section 51 and the light emission section 52 in synchronism with each other.

Subsequently, a detailed structure of a reflecting element 55 and a light emitting element 56 which form a pixel and time-divisional reception of a plurality of incoming lights from different directions are described. The reflecting element 55 has a structure similar to that of the reflecting element 15 while the light emitting element 56 has a structure similar to that of the light receiving element 16, and therefore, description is given below with reference to FIG. 5 again.

The reflecting element 55 includes a mirror plate 57 having a flat face for reflecting light and a pivot shaft 58 in the form of a rod-like shaft formed along a side of the mirror plate 57. The pivot shaft 58 is supported for pivotal motion. Thus, if electric static force, magnetic force, piezoelectric force or some other force is applied to the mirror plate 57, then the mirror plate 57 performs a pivotal motion around the axis of the pivot shaft 58.

The light emitting elements 56 includes light emitting diodes 59R, 59G and 59B corresponding to the wavelengths of lights of red (R), green (G) and blue (B), respectively, and disposed on the light emission section 52, and light guides 60R, 60G and 60B attached to the light emitting diodes 59R, 59G and 59B, respectively. Each of the light emitting diodes 59R, 59G and 59B is connected to the electric wiring formed on the light emission section 52 and emits light based on a potential difference produced between terminals in accordance with an electric signal supplied thereto from the synchronous control circuit 54. While the light emitting diodes 59R, 59G and 59B are listed here as elements for emitting light in accordance with an electric signal, elements of any other type may be used only if they emit light. Further, while it is described that the light guides 60R, 60G and 60B are attached to the light emitting diodes 59R, 59G and 59B for red, green and blue, respectively, alternatively a single light guide may attached as a light guide to a set of light emitting diodes 59R, 59G and 59B.

Now, a path of light is described using an example wherein light reflected by the mirror plate 57 arrives at the light emitting diode 59R through the light guide 60R. However, the description similarly applies also to the light guides 60G and 60B and the light emitting diodes 59G and 59B. The light guide 60R is a post-shaped light guide formed from an optical fiber or a like element and has a function of introducing light incoming from an end face to the opposite end face thereof without radiating light from a side face of the light guide 60R. The light guide 60R is attached at one end thereof to the light emitting diode 59R and has the other end disposed in an opposing relationship to the reflecting element 55. Therefore, since the light guide 60R functions as a light guide, the path of light emitted from the light emitting diode 59R is limited only to that toward the reflecting element 55.

If the path of light received by the reflecting element 55 from the light emitting diode 59R is an emission light path 61 and the angle defined by a plane perpendicular to the emission light path 61 and the mirror plate 57 is a reflection angle $\theta$ while the path along which light emitted from the light emitting diode 59R is reflected by the mirror plate 57 and advances toward the light outgoing opening 53 is an outgoing path 62, then the angle defined by the emission light path 61 and the outgoing path 62 is $2\theta$.

Accordingly, if the reflection angle $\theta$ successively changes to $\theta_1, \theta_2, \theta_3, \ldots, \theta_n$ when the time t successively passes to $t_1, t_2, t_3, \ldots, t_n$ while the mirror plate 57 is driven to pivot around the pivot shaft 58, then the light outgoing from the light outgoing opening 53 successively changes to lights to directions where the angles defined by the emission light path 61 and the outgoing path 62 are $2\theta_1, 2\theta_2, 2\theta_3, \ldots, 2\theta_n$, respectively. In short, the light emitting diode 59R emits the lights outgoing to different directions in accordance with electric signals as time passes. Such a change of the direction of the outgoing light as time passes is hereinafter referred to as time-divisional change of the display direction. Further, since the path of the incoming light changes as the reflecting element 55 is driven to change the reflection angle $\theta$, the reflecting element 55 functions as a light path selection element for selecting the path of light reception.

The synchronous control circuit 54 coordinates, regarding all of the pixels each formed from a combination of a reflecting element 55 and a light emitting element 56, an electric signal coordinated with the time t, reflection angle $\theta$ and pixel position with the driving control of the reflecting element 55 to the light emitting element 56. Consequently, a plurality of lights of different directions picked up time-divisionally by the three-dimensional image pickup apparatus 1 are time-divisionally displayed in a plurality of directions by the three-dimensional display apparatus 5. Thus, the three-dimensional display apparatus 5 can emit lights in the same directions in accordance with passage of time similar to those upon image pickup.

As described hereinabove, where the three-dimensional display apparatus 5 time-divisionally selects, based on electric signals with which the intensities and the incoming directions of lights time-divisionally incoming to the individual pixels are coordinated with each other by the three-dimensional image pickup apparatus 1, the outgoing direction of a light in accordance with the coordinated relationship with the incoming direction of the incoming light for each pixel and the viewer 6 sees the lights emitted from all of the pixels of the three-dimensional display apparatus 5, the viewer 6 recognizes a three-dimensional image by the reason described below with reference to FIG. 6.

Figure 6:
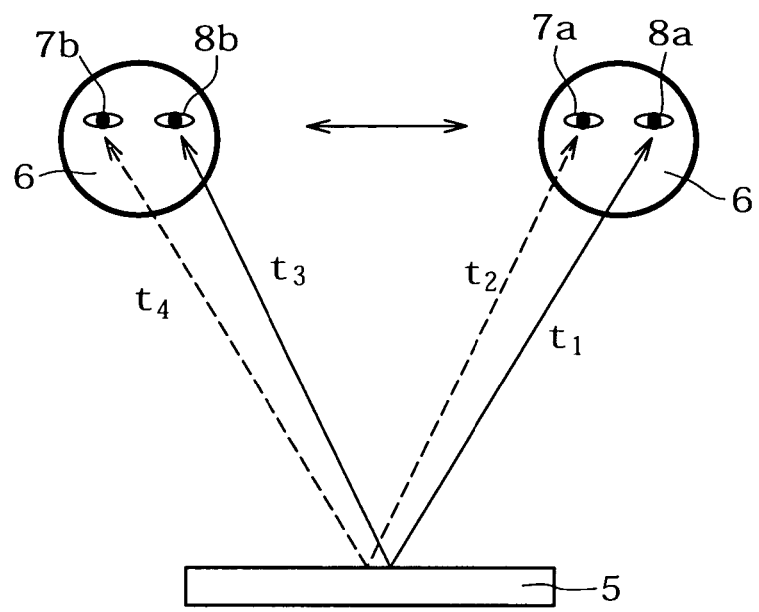
FIG. 6 is a schematic view illustrating a positional relationship of the three-dimensional display apparatus shown in FIG. 2 and the left and right eyes of the viewer.

FIG. 6 illustrates a positional relationship between the three-dimensional display apparatus 5 and the right eye 7 (7a or 7b) and the left eye 8 (8a or 8b) of the viewer 6. Referring to FIG. 6, since the right eye 7 and the left eye 8 of the viewer 6 have a predetermined spaced relationship from each other, even when the relative positions of the face of the viewer 6 and the three-dimensional display apparatus 5 do not vary, a light to be received by the right eye 7 and another light to be received by the left eye 8 are emitted in different emission directions from the three-dimensional display apparatus 5. In the time-divisional light emission, light emissions in different directions are performed at different times. Therefore, where the face is positioned as seen from the positions of the right eye 7a and the left eye 8a in FIG. 6, the light to be received by the right eye 7a is emitted at time $t_2$ and the light to be received by the left eye 8a is emitted at time $t_1$. Since the light emitted at time $t_1$ corresponds to a light in a direction received at time $t_1$ by the three-dimensional image pickup apparatus 1 whereas the light emitted at time $t_2$ corresponds to another light in another direction received at time $t_2$ by the three-dimensional image pickup apparatus 1, the images received by the right eye 7a and the left eye 8a are different from each other. In this instance, when the time interval between the times $t_1$ and $t_2$ is small, the human being cannot identify the two images as images at different times from each other. Consequently, the viewer recognizes the two images as an image having a parallax with the left and right eyes and therefore can recognize them as a three-dimensional image.

On the other hand, if the viewer 6 moves the face to another position as seen from the positions of the right eye 7b and the left eye 8b in FIG. 6, then the light to be received by the right eye 7b is emitted at time $t_4$ and the light to be received by the left eye 8b is emitted at time $t_3$. Since the light emitted at time $t_3$ corresponds to a light in a direction received at time $t_3$ by the three-dimensional image pickup apparatus 1 whereas the light emitted at time $t_4$ corresponds to another light in another direction received at time $t_4$ by the three-dimensional image pickup apparatus 1, the images received by the right eye 7b and the left eye 8b are different from each other. In this instance, when the time interval between times $t_3$ and $t_4$ is small, the human being cannot identify the two images as images at different times from each other due to the afterimage effect. Consequently, the viewer recognizes the two images as an image having a parallax with the left and right eyes and therefore can recognize them as a three-dimensional image. Further, since the directions in which the three-dimensional image pickup apparatus 1 receives the lights are different, the three-dimensional image recognized by the user at the position as seen from the positions of the right eye 7b and the left eye 8b is different from the three-dimensional image recognized at the position as seen from the positions of the right eye 7a and the left eye 8a.

If the number of directions of lights to be received by the three-dimensional image pickup apparatus 1 is increased and the number of directions of lights to be emitted from the three-dimensional display apparatus 5 is increased, then the distance by which the viewer changes the position of the face with respect to the three-dimensional display apparatus 5 in order to recognize a different three-dimensional image is decreased, which makes it possible to successively recognize different three-dimensional images.

Figure 7:
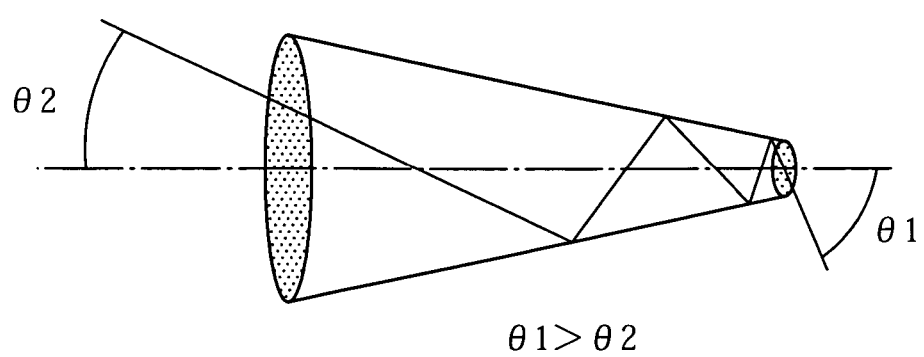
FIG. 7 is a schematic view showing another structure of a light guide used in the three-dimensional image pickup apparatus of FIG. 3.

FIG. 7 shows another structure of the light guide and particularly shows a light guide of a generally conical shape. Where the light guide has a conical shape having a sectional area which is smaller on the light emitting diode 19 side and is greater on the light incoming and outgoing side as seen in FIG. 7, a light incoming at an angle θ2 with respect to the center axis of the light guide successively increases the angle thereof with respect to the center axis as it is successively reflected by the inner face of the light guide. Accordingly, a light whose angle θ2 is large cannot come to the light emitting diode 19 while only another incoming light whose angle θ2 is small can be received by the light emitting diode 19. Therefore, the directionality of the light receiving direction is improved. It is to be noted that an outgoing light follows the path described above reversely.

Second Embodiment

Another embodiment of the present invention is described below. According to the present second embodiment, time-divisional reception of a plurality of lights from different directions and time-divisional emission of a plurality of lights in different directions are implemented by a single three-dimensional image pickup and display apparatus. In the present embodiment, light receiving elements and light emitting elements are provided on the opposite faces of the three-dimensional image pickup and display apparatus to perform pickup and display of a three-dimensional image.

Figure 8:
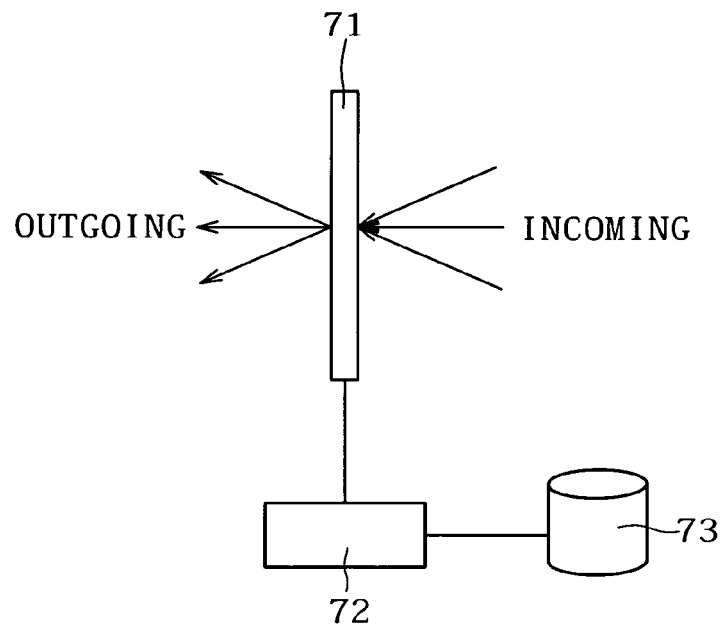
FIG. 8 is a block diagram showing a configuration of a three-dimensional image pickup and display apparatus to which the present invention is applied and wherein a light reception section and a light emission section are formed on the opposite faces of a same panel.

FIG. 8 shows a configuration wherein a light reception section and a light emission section are formed on the opposite faces of the same panel of a three-dimensional image pickup and display apparatus. A three-dimensional image pickup and display apparatus 71, an information processing module 72, and a recording apparatus 73 are connected to each other for information exchange. Thus, an image of a subject is picked up by the three-dimensional image pickup and display apparatus 71 and displayed by the three-dimensional image pickup and display apparatus 71.

The three-dimensional image pickup and display apparatus 71 includes the three-dimensional image pickup apparatus 1 and the three-dimensional display apparatus 5 of the first embodiment formed integrally such that they are exposed to the opposite faces of the three-dimensional image pickup and display apparatus 71. The information processing module 72 operates both as the information processing module 2 and the information processing module 4. The configuration of the remaining part and the operation of the three-dimensional image pickup and display apparatus 71 are similar to those of the first embodiment described hereinabove, and overlapping description of them is omitted herein to avoid redundancy.

Figure 9:
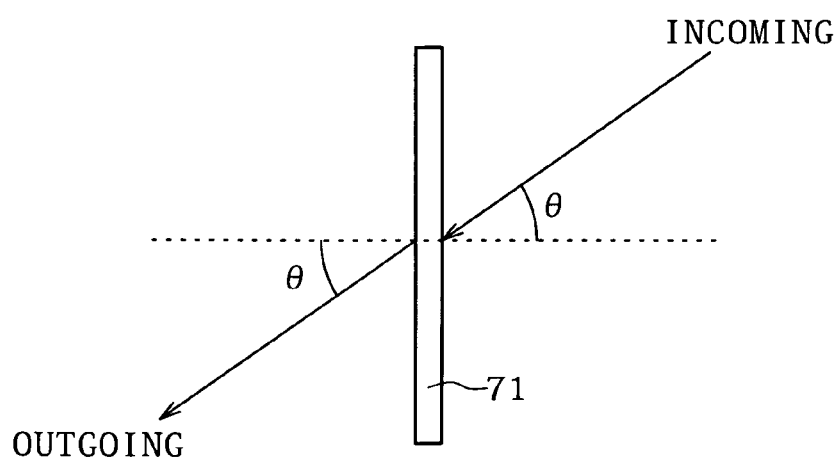
FIG. 9 is a diagrammatic view illustrating a relationship between the incoming angle of an incoming light and the outgoing angle of an outgoing light with respect to the normal direction to the three-dimensional image pickup and display apparatus of FIG. 8.

FIG. 9 diagrammatically illustrates a relationship of the incoming angle of an incident light and the outgoing angle of an outgoing light with respect to the normal direction to the three-dimensional image pickup and display apparatus 71. Referring to FIG. 9, where the incoming angle of the incoming light with respect to the normal direction to the three-dimensional image pickup and display apparatus 71 is θ, if the outgoing angle of the outgoing light is set to θ by the information processing module 72, then a three-dimensional image can be displayed similarly as in a case wherein light passes through the three-dimensional image pickup and display apparatus 71.

Third Embodiment

A further embodiment of the present invention is described below. According to the present third embodiment, time-divisional reception of a plurality of lights from different directions and time-divisional emission of a plurality of lights in different directions are implemented by a single three-dimensional image pickup and display apparatus. In the present embodiment, pickup and display of a three-dimensional image are performed by a three-dimensional image pickup and display apparatus wherein light receiving elements and light emitting elements are disposed in a mixed manner on a flat plate which performs a pivotal motion around an axis of pivotal motion.

Figure 10:
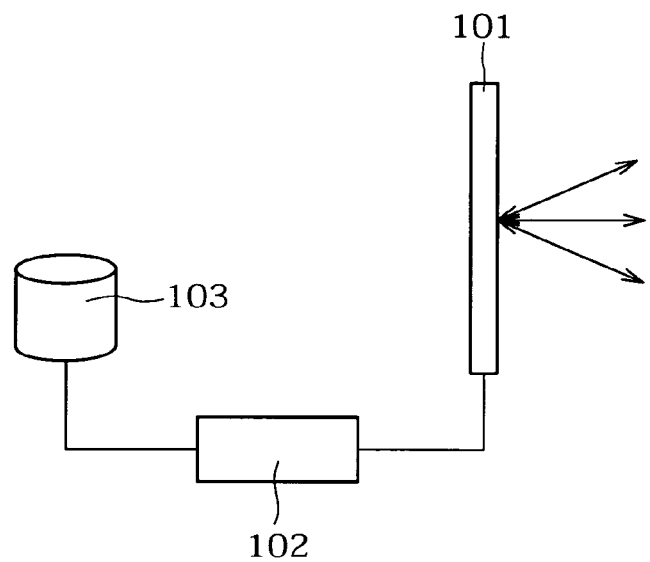
FIG. 10 is a block diagram showing a configuration of another three-dimensional image pickup and display apparatus to which the present invention is applied and wherein a light reception section and a light emission section are formed on the same face of the same panel.

FIG. 10 shows a configuration wherein the three-dimensional image pickup and display apparatus is used to perform pickup and display of a three-dimensional image. Referring to FIG. 10, the three-dimensional image pickup and display apparatus shown includes a three-dimensional image pickup and display apparatus 101, an information processing module 102, and a recording apparatus 103 connected for information exchange and performs pickup and display of a subject by means of the three-dimensional image pickup and display apparatus 101.

The three-dimensional image pickup and display apparatus 101 includes a plurality of light receiving and emitting elements disposed so as to form pixels and time-divisionally converts a plurality of lights incoming from different directions into electric signals with which the intensities and the incoming directions of the lights incoming to the individual pixels are coordinated with each other. The three-dimensional image pickup and display apparatus 101 outputs the electric signals to the information processing module 102. Further, the three-dimensional image pickup and display apparatus 101 time-divisionally selects light outgoing directions in accordance with the coordination with the incoming directions of the incoming lights for the individual pixels based on the electric signals transmitted from the information processing module 102 to display the lights to be emitted in the plural directions. It is to be noted that reception and emission of a light may be implemented by a single light receiving and emitting element or otherwise by a light receiving element and a light emitting element formed separately from each other but serving substantially as a single light receiving and emitting element. In the following description, a combination of functions which can perform both of light reception and light emission is referred to as light receiving and emitting element. Also where light receiving and emitting elements corresponding to red (R), green (G) and blue (B) of the three primary colors of light are provided as described hereinabove in connection with the first embodiment, they are hereinafter referred to merely as light receiving and emitting elements.

The information processing module 102 serves as an information processing apparatus which converts the received lights from the different directions into video signals. In particular, the information processing module 102 performs amplification, digitization, data compression and other necessary processes for the electric signals of the incoming lights transmitted thereto from the three-dimensional image pickup and display apparatus 101 to produce video signals. The information processing module 102 transmits the video signals to the recording apparatus 103. Further, the information processing module 102 serves as an information processing apparatus which converts video signals transmitted thereto from the recording apparatus 103 into electric signals. In particular, the recording apparatus 103 performs amplification, conversion into analog data, data decompression and so forth for the video signals to produce electric signals and transmits the electric signals to the three-dimensional image pickup and display apparatus 101.

The recording apparatus 103 is provided to record and retain a video signal for a predetermined period of time and may be, for example, a memory which is a semiconductor storage device which records information electrically, a magnetic disk or a magnetic tape which is a magnetic recording apparatus which records information magnetically, an apparatus which records information optically, or the like.

Figure 11:
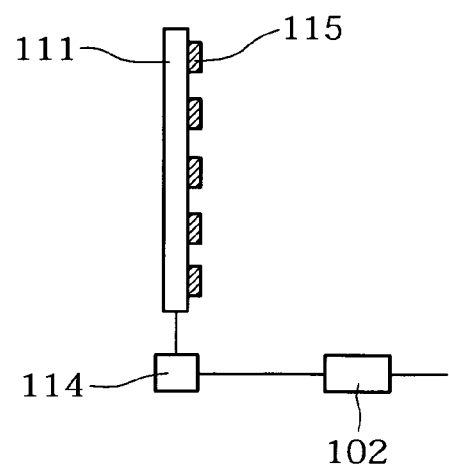
FIG. 11 is a schematic view showing a structure of the three-dimensional image pickup and display apparatus of FIG. 10.

FIG. 11 shows a structure of the three-dimensional image pickup and display apparatus 101 according to the present embodiment. Referring to FIG. 11, the three-dimensional image pickup and display apparatus 101 shown includes a light reception and emission section 111 on which light receiving and emitting elements 115 are disposed, and a synchronism control circuit 114 for synchronizing the incoming and outgoing directions of lights to be received by and emitted from the light reception and emission section 111 and electric signals with each other.

The light reception and emission section 111 includes a circuit board on which electric wiring (not shown) is formed. The plural light receiving and emitting elements 115 are arranged in row and column directions on a face of the light reception and emission section 111 on which pickup and display of an image are performed and receive lights incoming from the outside and beside emit lights to the outside. Each of the light receiving and emitting elements 115 is connected to the synchronism control circuit 114 through the electric wiring formed on the light reception and emission section 111 and changes the incoming directions and outgoing directions of lights in accordance with a control signal supplied from the synchronism control circuit 114.

The synchronism control circuit 114 is provided to control the directions of light reception and light emission of the light receiving and emitting elements 115. The synchronism control circuit 114 transmits electric signals of lights received by the light receiving and emitting elements 115 in a coordinated relationship with the directions of the received lights to the information processing module 102. Further, the synchronism control circuit 114 signals electric signals received from the information processing module 102 in synchronism with the light emission directions to the light receiving and emitting elements 115.

Figure 12A:
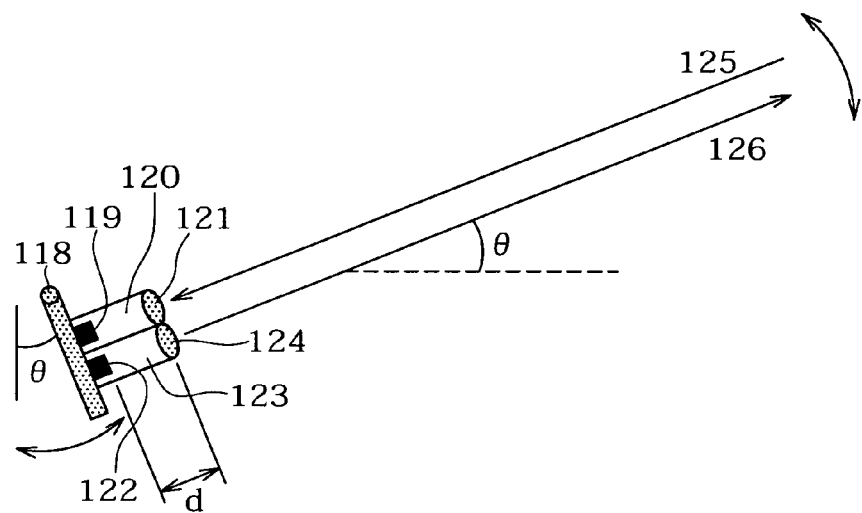
FIGS. 12A and 12B are schematic views showing a detailed structure of light receiving and emitting elements which form a pixel and time-divisional reception of a plurality of incoming lights from different directions as well as emission of a plurality of outgoing lights to different directions in the three-dimensional image pickup and display apparatus of FIG. 10.

Subsequently, a detailed structure of a light receiving and emitting element 115 which forms a pixel and time-divisional reception of a plurality of incoming lights from different directions and emission of a plurality of outgoing lights to different directions are described with reference to FIGS. 12A and 12B. FIG. 12A is a schematic sectional view showing a light receiving and emitting element 115 which forms a pixel, and FIG. 12B shows a structure of the light receiving and emitting element 115.

Figure 12B:
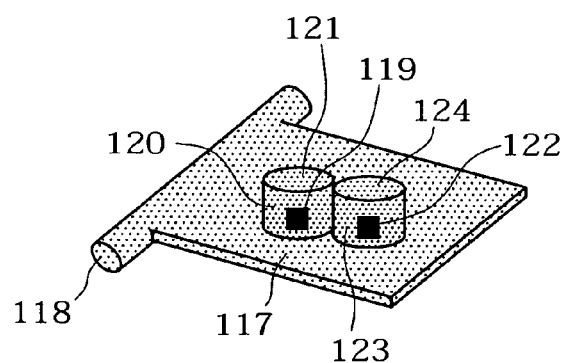

Referring to FIGS. 12A and 12B, the light receiving and emitting element 115 includes a flat face plate 117 in the form of a flat plate, and a pivot shaft 118 in the form of a rod-like shaft formed along a side of the flat face plate 117. The pivot shaft 118 is supported for pivotal motion, and when electrostatic force, magnetic force, piezoelectric force or like force is applied to the flat face plate 117, the flat face plate 117 is pivoted around an axis of the pivot shaft 118. The flat face plate 117 thus has a function as a driving member which performs rocking motion around the axis of the pivot shaft 118.

A light receiving element 119 and a light emitting element 122 are mounted on the flat face plate 117, and a light guide 120 is attached to the light receiving element 119 and a lens 121 is attached to an end of the light guide 120. Meanwhile, another light guide 123 is attached to the light emitting element 122 and another lens 124 is attached to an end of the light guide 123. The light guide 120 and the light guide 123 are secured at positions on the flat face plate 117 such that they extend in parallel to each other in the same direction.

Electric wiring not shown is formed on the flat face plate 117, and the light receiving element 119 and the light emitting element 122 are electrically connected to the information processing module 102 through the electric wiring on the flat face plate 117 and the electric wiring on the light reception and emission section 111. The light receiving element 119 and the light emitting element 122 are elements which have characteristics that they emit light if a voltage is applied thereto and generate a voltage if they receive light. A light emitting diode is used for the light receiving element 119 and the light emitting element 122.

The light guides 120 and 123 are post-like light guides each formed from an optical fiber or a like element and have a function of introducing light incoming from an end face thereof to the opposite end face thereof without admitting light in through a side face thereof. The light guides 120 and 123 have a length set substantially equal to the focal length d of the lenses 121 and 124, and the light receiving element 119 and the light emitting element 122 are disposed at focal positions of the lenses 121 and 124, respectively. Accordingly, only that part of light incoming from the outside which passes an incoming path 125 which is a path of incoming light is refracted and condensed on the light receiving element 119 by the lens 121. On the other hand, light emitted from the light emitting element 122 is refracted by the lens 124, and consequently, the light of the light emitting element 122 outgoing to the outside follows an outgoing path 126. Since the light guide 120 and the light guide 123 are disposed securely in parallel to each other to the flat face plate 117, the incoming path 125 which is a path of the incoming light and the outgoing path 126 which is a path of the outgoing light extend in parallel to each other and have angles equal to each other with respect to the flat face plate 117.

If the angle $\theta$ defined by the flat face plate 117 and the light reception and emission section 111 successively changes to $\theta_1, \theta_2, \theta_3, \ldots, \theta_n$ an when the time t successively passes to $t_1, t_2, t_3, \ldots, t_n$ while the flat face plate 117 is driven to pivot around the pivot shaft 118, then also the angle defined by the normal direction to the light reception and emission section 111 and the incoming path 125 and outgoing path 126 successively changes to $\theta_1, \theta_2, \theta_3, \ldots, \theta_n$. Since the paths of the incoming light and the outgoing light change as the light receiving and emitting elements 115 is driven to change the angle $\theta$ defined by the flat face plate 117 and the light reception and emission section 111, the light receiving and emitting elements 115 functions as a light path selection element for selecting the paths of light reception and light emission.

Since the synchronism control circuit 114 receives an electric signal of light received by the light receiving element 119 in a coordinated relationship with driving control of the light receiving and emitting element 115, the circuit 114 transmits the time t, incoming angle of the incoming light, pixel position and electric signal regarding all of the pixels in a coordinated relationship with each other to the information processing module 102. Accordingly, received lights in the image pickup direction which time-divisionally vary with all of the pixels are transmitted as electric signals to the information processing module 102.

The information processing module 102 performs amplification, digitization, data compression and other necessary processes for the received electric signals to convert them into video signals and transmits the video signals to the recording apparatus 103. The recording apparatus 103 thus records the video signals. The recorded video signals are read out by the information processing module 102, and the information processing module 102 performs amplification, conversion into analog data, data decompression and other necessary processes for the video signals to convert the video signals into electric signals. The information processing module 102 transmits the electric signals obtained by the conversion in the order of passage of time to the three-dimensional image pickup and display apparatus 101. The synchronism control circuit 114 transmits the electric signals in each of which the time t, outgoing angle of the outgoing light and pixel position are coordinated with each other to the light emitting element 122 in a coordinated relationship with the driving control of the light receiving and emitting elements 115. Consequently, if the three-dimensional image pickup and display apparatus 101 displays a plurality of lights in different directions picked up time-divisionally by the three-dimensional image pickup and display apparatus 101 time-divisionally in different directions, then light emission can be performed in the same directions as time passes similarly as upon image pickup.

When the three-dimensional image pickup and display apparatus 101 time-divisionally receives a plurality of lights in different directions and then time-divisionally emits a plurality of lights in different directions as described above, if the viewer sees the emitted lights from all of the pixels of the three-dimensional image pickup and display apparatus 101, then the viewer will recognize a three-dimensional image because of the reason described hereinabove in connection with the first embodiment with reference to FIG. 6.

Figure 13A:
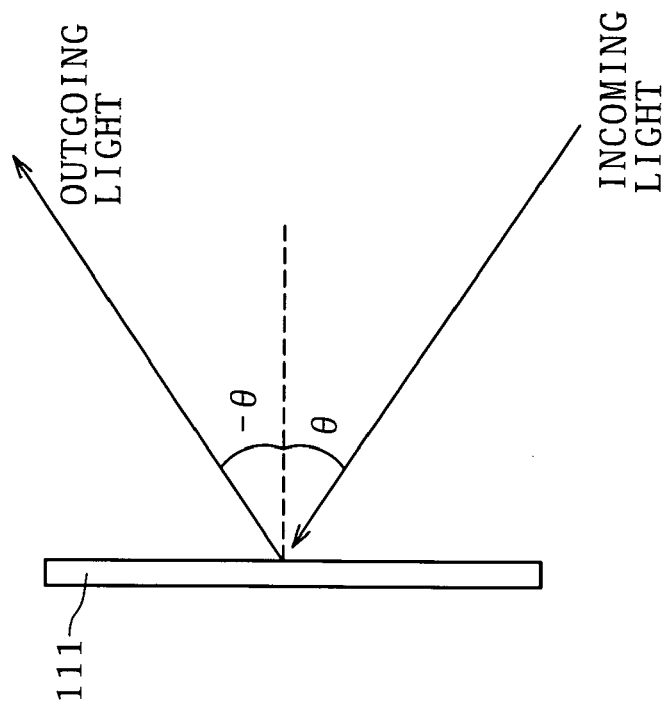
FIGS. 13A and 13B are diagrammatic views illustrating different relationships between the incoming angle of an incoming light and the outgoing angle of an outgoing light with respect to the normal direction of the light reception and emission section in the three-dimensional image pickup and display apparatus of FIG. 10.
Figure 13B:
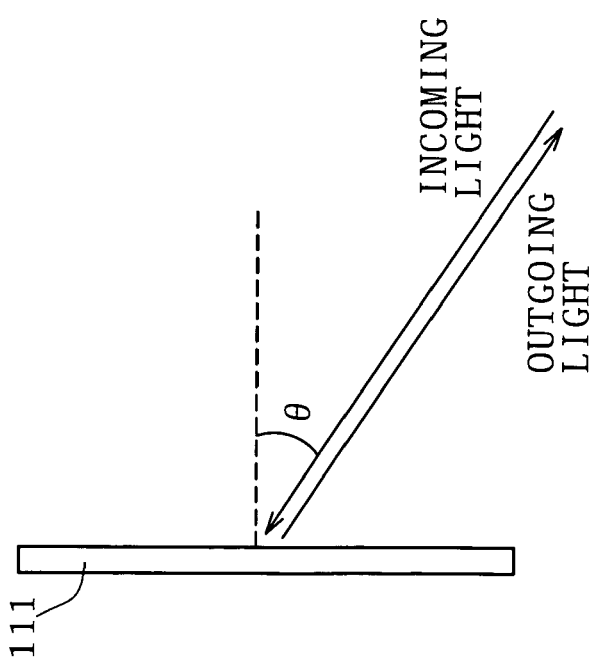

While it is described above that the incoming angle of an incoming light and the outgoing angle of an outgoing light with respect to the normal direction to the light reception and emission section 111 are equal to each other as seen in FIG. 13A, alternatively they may have a mirror-reflective relationship such that, where the incoming angle of the incoming light with respect to the normal direction to the light reception and emission section 111 is $\theta$, the outgoing angle of the outgoing light is set to $-\theta$ as seen in FIG. 13B by the information processing module 102.

Fourth Embodiment

A still further embodiment of the present invention is described below. According to the present fourth embodiment, time-divisional reception of a plurality of lights from different directions and time-divisional emission of a plurality of lights in different directions are implemented by a single three-dimensional image pickup and display apparatus. In the present embodiment, pickup and display of a three-dimensional image are performed by the three-dimensional image pickup and display apparatus wherein a microlens apparatus disposed in front of light emitting elements or light receiving elements is oscillated periodically to change the advancing direction of light.

The configuration wherein the three-dimensional image pickup and display apparatus of the present embodiment is used to perform pickup and display of a three dimensional image is similar to that described hereinabove in connection with the third embodiment with reference to FIG. 10. Thus, description of the configuration is omitted herein to avoid redundancy.

Figure 14:
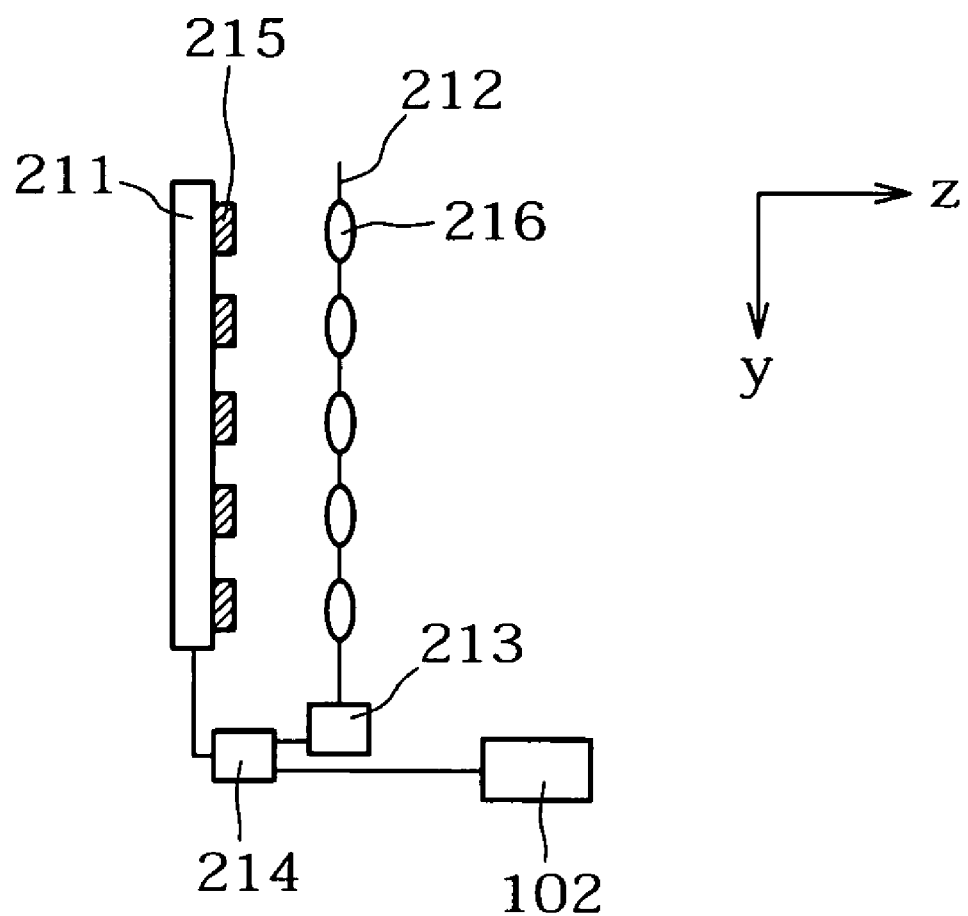
FIG. 14 is a schematic view showing a structure of a further three-dimensional image pickup and display apparatus to which the present invention is applied.

FIG. 14 shows a structure of the three-dimensional image pickup and display apparatus 101 according to the present embodiment. Referring to FIG. 14, the three-dimensional image pickup and display apparatus 101 shown includes a light reception and emission section 211 on which light receiving and emitting elements 215 are disposed, a lens array 212 disposed in front of the light reception and emission section 211, an oscillation apparatus 213 for displacing the lens array 212 in a y-axis direction in FIG. 14, and a synchronism control circuit 214 for synchronizing electric signals of light received and emitted by and from the light reception and emission section 211 with the displacement of the lens array 212.

The light reception and emission section 211 includes a circuit board on which electric wiring (not shown) is formed. A plurality of light receiving and emitting elements 215 are arranged in row and column directions on a face of the light reception and emission section 211 on which pickup and display of an image are performed and are each formed from a light emitting diode which receives a light incoming from the outside and emits a light to the outside. Each of the light receiving and emitting elements 215 is connected to the synchronism control circuit 214 through the electric wiring formed on the light reception and emission section 211 and performs light reception or light emission in accordance with a control signal supplied thereto from the synchronism control circuit 214.

The lens array 212 includes a plurality of microlenses 216 disposed in row and column directions. Each of the microlenses 216 which are very small optical lenses is disposed in an opposing and paired relationship to and with one of the light receiving and emitting elements 215 of the light reception and emission section 211 to form a pixel. The lens array 212 is displaced periodically in the y-axis direction in FIG. 14 in parallel to the light reception and emission section 211 by the oscillation apparatus 213. The oscillation apparatus 213 is formed using a piezoelectric element and controls the displacement amount in the y-axis direction from the origin of the lens array 212 in accordance with a control signal from the synchronism control circuit 214.

The synchronism control circuit 214 is provided to control the directions of light reception and light emission of the light receiving and emitting elements 215. The synchronism control circuit 214 transmits electric signals by which the intensities of lights received by the light receiving and emitting elements 215 are coordinated with the displacement of the lens array 212 to the information processing module 102. Further, the synchronism control circuit 214 synchronizes the displacement of the lens array 212 and light emission of the light receiving and emitting elements 215 with each other in accordance with electric signals received from the information processing module 102.

Figure 15A:
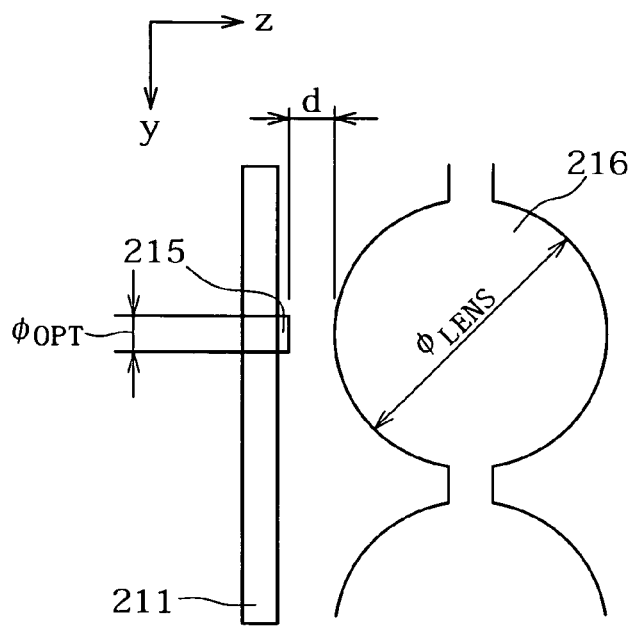
FIGS. 15A and 15B are schematic views illustrating a positional relationship between light receiving and emitting elements and a microlens apparatus in the three-dimensional image pickup and display apparatus of FIG. 14.
Figure 15B:
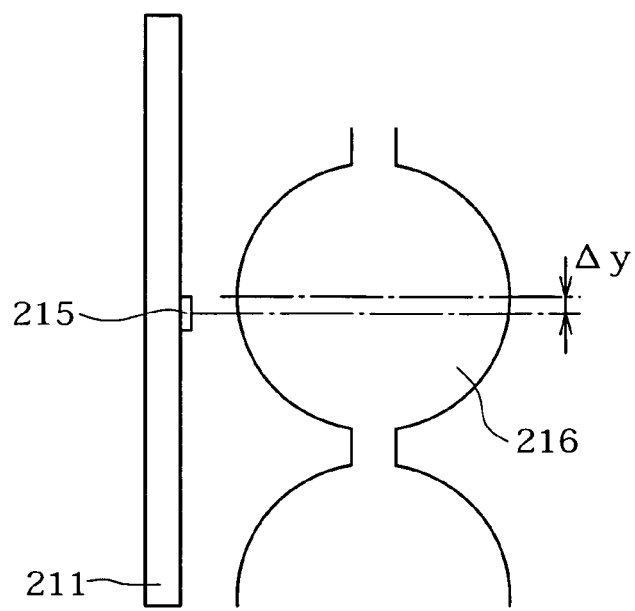

FIGS. 15A and 15B illustrate a positional relationship between a light receiving and emitting element 215 and a microlens 216. The light receiving and emitting element 215 disposed on the light reception and emission section 211 and the microlens 216 disposed on the lens array 212 are opposed to each other with a focal length d left therebetween in the z-axis direction in FIGS. 15A and 15B. In FIG. 15A, $\Phi_{OPT}$ represents the diameter of a face of the light receiving and emitting element 215 from which light is emitted, and $\Phi_{LENS}$ represents the diameter of the microlens 216. Further, the difference between the center of the microlens 216 and the center of the light receiving and emitting element 215 in the y-axis direction is represented by the displacement $\Delta y$.

If the oscillation apparatus 213 displaces the lens array 212 in the y-axis direction in accordance with a control signal from the synchronism control circuit 214, then also the displacement $\Delta y$ between the center of the microlens 216 and the center of the light receiving and emitting element 215 in the y-axis direction varies. Since the variation of the displacement $\Delta y$ varies the relative positions of the microlens 216 and the light receiving and emitting element 215, the incoming path of an incoming light which passes through the microlens 216 and comes to the light receiving and emitting elements 215 and the outgoing path of a light emitted from the light receiving and emitting element 215 along which the light passes through the microlens 216 and goes out to the outside vary.

FIG. 16 illustrates a concept of a variation of the relative positional relationship between the microlens 216 and the light receiving and emitting element 215 and variations of the incoming path and the outgoing path. Referring to FIG. 16, when the microlens 216 is displaced by the oscillation apparatus 213 to change the relative position of the light receiving and emitting element 215 to the microlens 216 as indicated by 215a to 215d, the path of light arriving at the light receiving and emitting element 215a to 215d varies to the directions of the incoming paths 217a to 217d, respectively. Similarly, the path along which light passes through the lens and goes out when the light receiving and emitting element 215a to 215d emits light varies to the directions of 218a to 218d, respectively. In other words, since the lens array 212 is displaced by the oscillation apparatus 213 to vary the relative positions between the microlens 216 and the light receiving and emitting element 215, the direction in which light comes in and the direction in which light goes out can be varied.

Figure 17:
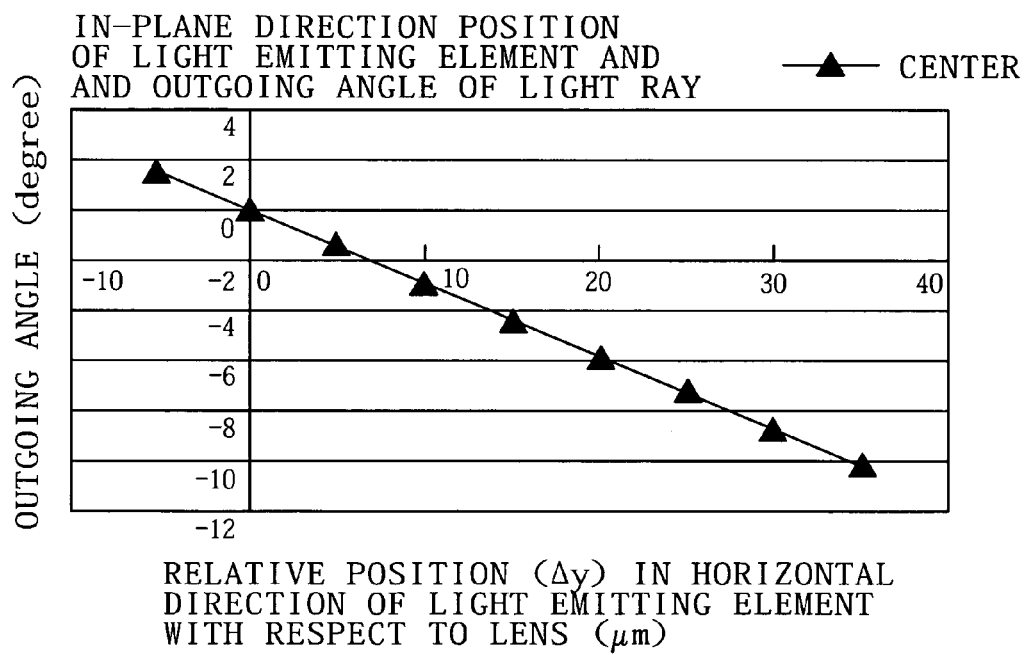
FIG. 17 is a graph illustrating a relationship between the outgoing angle of an outgoing light and the displacement $\Delta y$ in the three-dimensional image pickup and display apparatus of FIG. 14.

FIG. 17 illustrates a relationship between the outgoing angle defined by the advancing direction of a outgoing light and the normal direction to the light reception and emission section 211 and the displacement $\Delta y$ which is the difference between the center of the microlens 216 and the center of the light receiving and emitting element 215 in the y-axis direction. The diameter $\Phi_{LENS}$ of the microlens 216 is set to 300 μm, and the distance d between the microlens 216 and the light receiving and emitting element 215 in the z-axis direction is set to 50 μm. It can be seen from FIG. 17 that the variation of the displacement $\Delta y$ and the variation of the outgoing angle have a proportional relationship to the variation. Since the incoming path of the incoming light and the outgoing path of the outgoing light are same, a similar relationship is satisfied also by the incoming direction defined by the advancing direction of the incoming light and the normal direction to the light reception and emission section 211. Since the oscillation of the microlens 216 varies the displacement $\Delta y$ and the outgoing angle to vary the paths of the incoming and outgoing lights, the microlens 216 functions as a light path selection element for selecting the paths of light reception and light emission.

FIG. 18 illustrates refractive indices of PMMA (polymethyl methacrylate, acrylic resin) materials used as a material for the microlenses 216. Since the materials have substantially equal refractive indices with regard to blue, green and red of the three primary colors of light, it can be seen that, also where a plurality of light receiving and emitting elements 215 for blue, green and red are disposed for each one pixel to receive and emit lights of blue, green and red, respectively, the light incoming direction and the light outgoing direction can be varied by the displacement of the microlens 216 described above.

Since the synchronism control circuit 214 receives an electric signal of light received by the light receiving and emitting element 215 in a coordinated relationship with driving control of the lens array 212, the circuit 214 transmits the time t, displacement $\Delta y$ of the microlens 216, pixel position and electric signal in a coordinated relationship with regard to all of the pixels to the information processing module 102. Accordingly, received light in the image pickup direction which time-divisionally varies with all of the pixels is transmitted as an electric signal.

The information processing module 102 performs amplification, digitization, data compression and other necessary processes for the received electric signals to convert them into video signals and transmits the video signals to the recording apparatus 103. The recording apparatus 103 thus records the video signals. The recorded video signals are read out by the information processing module 102, and the information processing module 102 performs amplification, conversion into analog data, data decompression and other necessary processes for the video signals to convert the video signals into electric signals. The information processing module 102 transmits the electric signals obtained by the conversion in the order of passage of time to the three-dimensional image pickup and display apparatus 101. The synchronism control circuit 214 signals the electric signals in each of which the time t, displacement $\Delta y$ of a microlens and pixel position are coordinated with each other to the light receiving and emitting elements 215 in a coordinated relationship with the driving control of the lens array 212. Consequently, when the three-dimensional image pickup and display apparatus 101 displays a plurality of lights in different directions picked up time-divisionally by the three-dimensional image pickup and display apparatus 101 time-divisionally in different directions, light emission can be performed in the same directions as time passes as upon image pickup.

When the three-dimensional image pickup and display apparatus 101 time-divisionally receives a plurality of lights from different directions and then time-divisionally emits a plurality of lights in different directions as described above, if the viewer sees the emitted lights from all of the pixels of the three-dimensional image pickup and display apparatus 101, then the viewer will recognize a three-dimensional image because of the reason described hereinabove in connection with the first embodiment with reference to FIG. 6.

Fifth Embodiment

A yet further embodiment of the present invention is described below. Also according to the present fifth embodiment, time-divisional reception of a plurality of lights from different directions and time-divisional emission of a plurality of lights in different directions are implemented by a single three-dimensional image pickup and display apparatus. In the present embodiment, pickup and display of a three-dimensional image are performed by the three-dimensional image pickup and display apparatus wherein a path of light is selected by a liquid crystal-containing waveguide disposed in front of each of light emitting elements or light receiving elements.

The configuration wherein the three-dimensional image pickup and display apparatus of the present embodiment is used to perform pickup and display of a three dimensional image is similar to that described hereinabove in connection with the third embodiment with reference to FIG. 10. Thus, description of the configuration is omitted herein to avoid redundancy.

Figure 19:
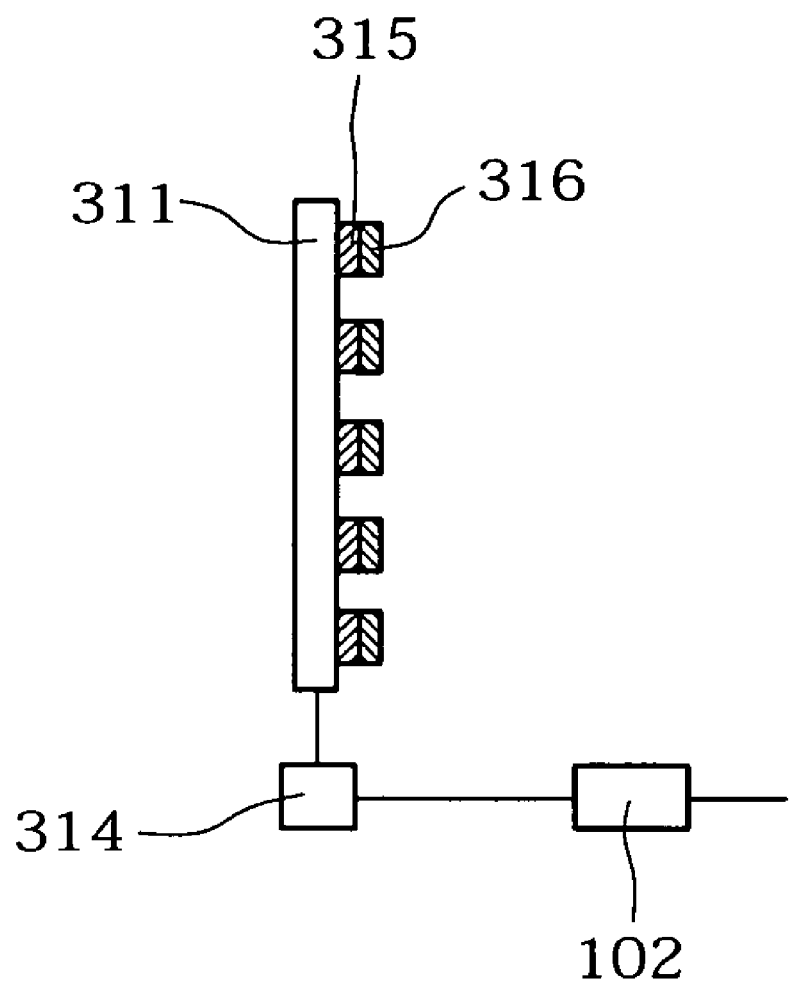
FIG. 19 is a schematic view showing a structure of a still further three-dimensional image pickup and display apparatus to which the present invention is applied.

FIG. 19 shows a structure of the three-dimensional image pickup and display apparatus 101 according to the present embodiment. Referring to FIG. 19, the three-dimensional image pickup apparatus 101 includes a light reception and emission section 311 having light receiving and emitting elements 315 disposed thereon, a liquid crystal light path selection element 316 disposed in a layered state on a light reception emission face of each of the light receiving and emitting elements 315, and a synchronism control circuit 314 for synchronizing electric signals of light received by or emitted from the light reception and emission section 311 with operation of the liquid crystal light path selection element 316.

The light reception and emission section 311 includes a circuit board on which electric wiring (not shown) is formed. A plurality of light receiving and emitting elements 315 are arranged in row and column directions on a face of the light reception and emission section 311 on which pickup and display of an image are performed and are each formed from a light emitting diode which receives a light incoming from the outside and emits a light to the outside. Each of the light receiving and emitting elements 315 is connected to the synchronism control circuit 314 through the electric wiring formed on the light reception and emission section 311 and performs light reception or light emission in accordance with a control signal supplied thereto from the synchronism control circuit 314.

The liquid crystal light path selection element 316 is disposed in a layered state on the light reception emission face of each of the light receiving and emitting elements 315 for selectively changing the path of light to be received by or emitted from the light receiving and emitting element 315 to select an incoming path of light to come in to the light receiving and emitting element 315 and an outgoing path of light to be emitted from the light receiving and emitting element 315. The liquid crystal light path selection element 316 thus functions as a liquid crystal waveguide.

The synchronism control circuit 314 is provided to control the directions of light reception and light emission of the light receiving and emitting elements 315. The synchronism control circuit 314 transmits an electric signal of light received by the light receiving and emitting elements 315 in a coordinated relationship with the incoming direction of light to be selected by the liquid crystal light path selection element 316 to the information processing module 102. The liquid crystal light path selection element 316 transmits the electric signal received from the information processing module 102 in synchronism with the outgoing direction of light to be selected by the liquid crystal light path selection element 316 to the light receiving and emitting element 315.

FIGS. 20A and 20B schematically show a structure of the liquid crystal light path selection element 316 and illustrate selection of a path of light. FIG. 20A is a plan view and FIG. 20B is a perspective view thereof. The liquid crystal light path selection element 316 is structured such that a light path 321 and another light path 322 each in the form of a cavity are formed in a framework 320 formed from a resin material. A light path electrode 323a and another light path electrode 323b are disposed on an upper face and a lower face of the light path 321, respectively, and liquid crystal is filled in the light path 321. A light path electrode 324a and another light path electrode 324b are disposed on an upper face and a lower face of the light path 322, respectively, and liquid crystal is filled in the light path 322.

One end of each of the light paths 321 and 322 is formed as a cavity common on the face of the framework 320 opposing to the light receiving and emitting element 315, and the other ends of the light paths 321 and 322 are formed as cavities which extend to different portions of the framework 320. Further, a shielding film for intercepting visible rays of light is formed around the framework 320, but no shielding film is formed on the light path 321 and the end portions of the light path 321.

Selection of a path of light by the liquid crystal light path selection element 316 is performed by applying a voltage either between the light path electrode 323a and the light path electrode 323b or between the light path electrode 324a and the light path electrode 324b. For example, where the light refraction index of a resin material from which the framework 320 is formed is 1.42 and the refraction index of the liquid crystal filled in the light paths 321 and 322 is 1.60 upon application of the voltage but is 1.42 upon application of no voltage, light passes the light path filled with the liquid crystal to which the voltage is applied.

Accordingly, if the liquid crystal light path selection element 316 changes the electrode to which a voltage is to be applied in accordance with a control signal from the synchronism control circuit 314, then when the voltage is applied between the light path electrode 323a and the light path electrode 323b, light passes through the light path 321. Reception and emission of light in the direction indicated by an arrow mark A by and from the light receiving and emitting element 315 can be performed. On the other hand, if the voltage is applied between the light path electrode 324a and the light path electrode 324b, since light passes through the light path 322, reception and emission of the light in the direction indicated by another arrow mark B by and from the light receiving and emitting element 315 can be performed. Since the refractive index of the liquid crystal varies in response to the applied voltage to the liquid crystal light path selection element 316 to change the paths of incoming and outgoing lights, the liquid crystal light path selection element 316 functions as a light path selection element for selecting the paths of reception and emission lights.

Figure 21:
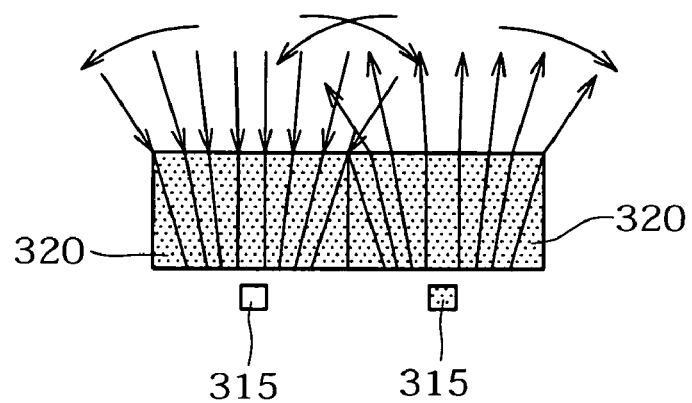
FIG. 21 is a schematic view illustrating a manner wherein the number of light paths is increased to make it possible to select one of a number of directions of light reception and emission corresponding to the number of light paths in the three-dimensional image pickup and display apparatus of FIG. 19.

While FIGS. 20A and 20B illustrate an example wherein two paths are formed in the framework 320, if the number of light paths is increased, then selection of a number of directions of reception and emission lights corresponding to the number of light paths is possible. Thus, it is possible to suitably change the incoming path of an incoming light which passes through the liquid crystal light path selection element 316 and comes to the light receiving and emitting element 315 and the outgoing path along which a light emitted from the light receiving and emitting element 315 passes through the liquid crystal light path selection element 316 and goes out to the outside from among the incoming and outgoing paths to time-divisionally select a light reception and emission direction as seen from FIG. 21.

As described hereinabove, if the three-dimensional image pickup and display apparatus 101 time-divisionally receives a plurality of lights from different directions and time-divisionally emits a plurality of lights in different directions and the viewer sees the emitted lights from all of the pixels of the three-dimensional image pickup and display apparatus 101, then the viewer recognizes a three-dimensional image from the reason described hereinabove with reference to FIG. 6 in connection with the first embodiment.

Sixth Embodiment

A yet further embodiment of the present invention is described below. According to the present sixth embodiment, time-divisional reception of a plurality of lights from different directions and time-divisional emission of a plurality of lights in different directions are implemented by a single three-dimensional image pickup and display apparatus. In the present embodiment, pickup and display of a three-dimensional image are performed by the three-dimensional image pickup and display apparatus wherein a path of light is selected by a light interference path disposed in front of the light emitting element or the light receiving element.

The present embodiment employs a Mach-Zehnder light path selection element 416 in place of the liquid crystal light path selection element 316 employed in the three-dimensional image pickup and display apparatus 101 of the fifth embodiment described hereinabove with reference to FIG. 19. Except this, the present embodiment has a similar configuration to that of the fifth embodiment, and therefore, overlapping description of the configuration is omitted herein to avoid redundancy.

Figure 22:
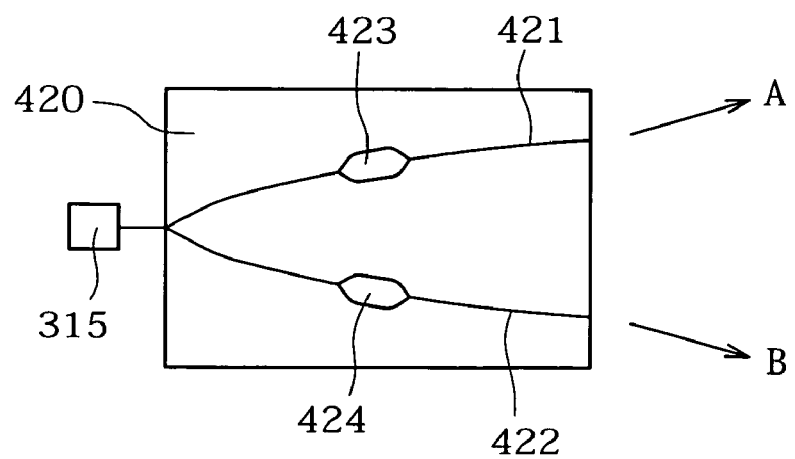
FIG. 22 is a plan view showing a structure of a Mach-Zehnder light path selection element which can be applied to a yet further three-dimensional image pickup and display apparatus to which the present invention is applied.

FIG. 22 shows a structure of the Mach-Zehnder light path selection element 416. Referring to FIG. 22, the Mach-Zehnder light path selection element 416 includes a framework 420 formed from a resin material which does not pass visible light therethrough, and a light path 421 and another light path 422 formed in the framework 420 in such a manner as to pass light therethrough. A light interference path 423 is formed at an intermediate portion of the light path 421 while another light interference path 424 is formed at an intermediate portion of the light path 422. Each of the light paths 421 and 422 is exposed at one end thereof to a face of the framework 420 which opposes to the light receiving and emitting element 315 and at the other end thereof to the other face of the framework 420.

Selection of a light path by the Mach-Zehnder light path selection element 416 is performed by causing a light to interfere in the light interference path 423 or the light interference path 424 to cancel the light. Light is not received or emitted through the light path in which light is canceled by interference, but light can be received and emitted by and from the light receiving and emitting element 315 only through the light path in which no light cancellation occurs.

Figure 23A:
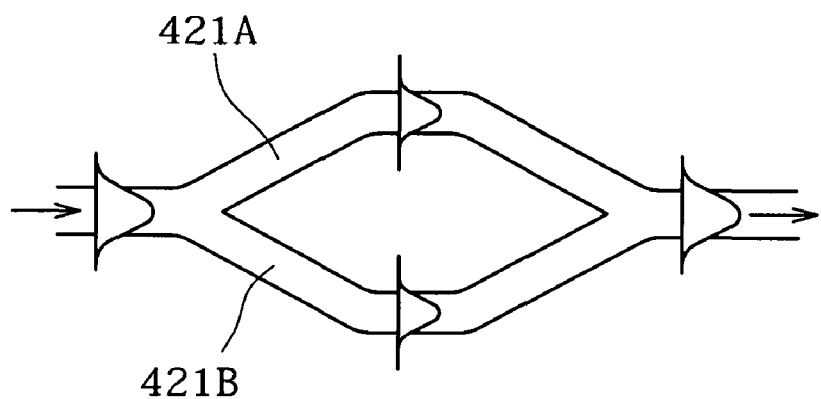
FIGS. 23A and 23B are schematic views illustrating cancellation of lights by a light interference path in the Mach-Zehnder light path selection element of FIG. 22.
Figure 23B:
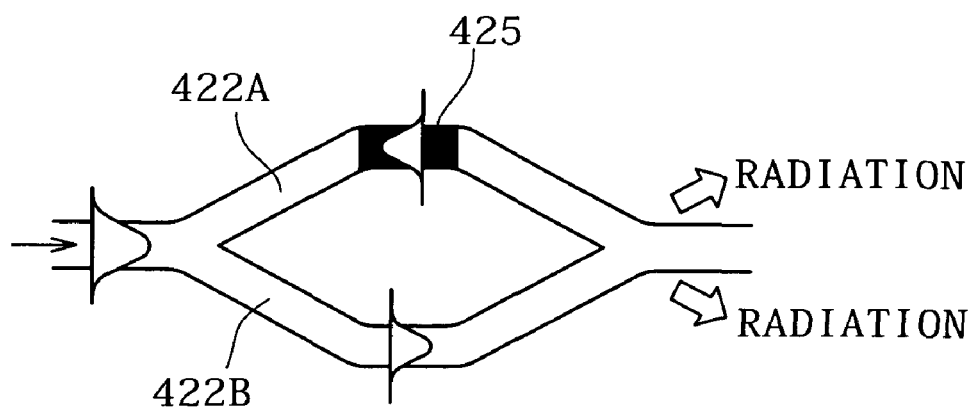

FIGS. 23A and 23B illustrate cancellation of light by the light interference paths 423 and 424. In particular, FIG. 23A schematically illustrates a phase and an intensity of light which passes the light interference paths 423 and 424 where no light cancellation is involved. Referring to FIG. 23A, light incoming through one end of the light path 421 is branched and passes a partial light path 421A and another partial light path 421B and then joins together with the same phase at the light path 421, whereafter it is emitted from the other end of the light path 421. At this time, if the difference in length between the paths of the partial light path 421A and the partial light path 421B is set equal to an integral number of times the wavelength of the light which passes the partial light path 421A and the partial light path 421B, then the branched lights can join together with the same phase and light having an equal intensity to that of the incoming light can be emitted.

FIG. 23B schematically illustrates the phase and the intensity of light which passes the light interference paths 423 and 424 where cancellation of light is involved. Referring to FIG. 23B, light incoming through one end of the light path 422 is branched and passes a partial light path 422A and another partial light path 422B and then joins together with the opposite phases to each other at the light path 422, whereafter it is emitted from the other end of the light path 422. At this time, even if the difference in length between the paths of the partial light path 422A and the partial light path 422B is set to an integral number of times the wavelength of the light which passes the partial light path 422A and the partial light path 422B, the phases of the branched lights when they join together have a displacement by a half wavelength from each other under the control of a phase control portion 425 formed intermediately of the partial light path 422A thereby to eliminate the amplitude which is the intensity of the incoming light to cancel the light.

The phase control portion 425 includes a liquid crystal layer whose refractive index varies if a voltage is applied thereto, and electrodes. The phase control portion 425 functions as a half wavelength plate wherein, when no voltage is applied thereto, the partial light path 422A and the light path 422 have an equal refractive index, but when a voltage is applied thereto, the refractive index of the liquid crystal layer varies to displace the phase of the light passing therethrough by a half wavelength from that of the transmission light therethrough when no voltage is applied.

Accordingly, if a voltage is applied to the phase control portion 425 of the light interference path 423 while no voltage is applied to the phase control portion 425 of the light interference path 424 in accordance with a control signal from the synchronism control circuit 314, then light passing through the light path 421 cancels itself while light passes through the light path 422. Therefore, reception and emission of light by and from the light receiving and emitting element 315 in the A direction in FIG. 22 are disabled while reception and emission of light by and from the light receiving and emitting elements 315 in the B direction are permitted. Since the light path wherein light is canceled changes in response to a voltage applied to one of the phase control portions 425 of the Mach-Zehnder light path selection element 416 to change the paths of incoming and outgoing lights, the Mach-Zehnder light path selection element 416 functions as a light path selection element for selecting the paths of light reception and emission.

While FIG. 22 illustrates an example wherein two light paths are formed in the framework 420, if the number of light paths is increased, then selection of a number of directions of reception and emission lights corresponding to the number of light paths is permitted. Thus, it is possible to suitably change the incoming path of an incoming light which passes through the Mach-Zehnder light path selection element 416 and comes to the light receiving and emitting element 315 and the outgoing path along which a light emitted from the light receiving and emitting element 315 passes through the Mach-Zehnder light path selection element 416 and goes out to the outside to time-divisionally select a light reception and emission direction.

While preferred embodiments of the present invention have been described using specific terms, such description is for illustrative purposes only, and it is to be understood that changes and variations may be made without departing from the spirit or scope of the following claims.

What is claimed is:

1. A three-dimensional image pickup and display apparatus, comprising:
   a light reception section including a plurality of light receiving elements for receiving and converting light into an electric signal and a plurality of first light path selection elements for selecting an incoming angle of light to come to said light receiving elements, said light receiving elements and said first light path selection elements being arranged such that a plurality of pixels formed from said light receiving elements and said first light path selection elements are disposed both in a row direction and a column direction, intensities of the light received by said light receiving elements and the incoming angles of light selected by said first light path selection elements being coordinated with each other for the individual pixels to form video signals; and
   a light emission section including a plurality of light emitting elements for emitting light in accordance with an electric signal and a plurality of second light path selection elements for selecting an outgoing angle of light to be emitted from said light emitting elements, said light emitting elements and said second light path selection elements being arranged such that a plurality of pixels formed from said light emitting elements and said second light path selection elements are disposed both in a row direction and a column direction, said light emitting elements emitting light in accordance with a coordinated relationship between the outgoing angles of light selected by said second light path selection elements and the intensities of light for the individual pixels based on the video signals, wherein the incoming angle of light incoming to said light reception section and the outgoing angle of light outgoing from said light emission section are equal to each other.

2. A three-dimensional image pickup and display apparatus according to claim 1, wherein each of the pixels in said light reception section is formed from one of said light receiving elements and one of said light path selection elements which are paired with each other, and each of the pixels in said light emission section is formed from one of said light emitting elements and one of said light path selection elements which are paired with each other.

3. A three-dimensional image pickup and display apparatus according to claim 1, wherein the incoming angle selected by each of said first light path selection elements and the outgoing angle of light selected by each of said second light path selection elements vary as time passes.

4. A three-dimensional image pickup and display apparatus according to claim 1, wherein said light reception section and said light emission section are formed separately from each other.

5. A three-dimensional image pickup and display apparatus according to claim 4, wherein said light reception section and said light emission section are connected to each other for information exchange therebetween such that the video signals are transmitted from said light reception section to said light emission section.

6. A three-dimensional image pickup and display apparatus according to claim 1, wherein said light reception section and said light emission section are formed on the same face of the same apparatus.

7. A three-dimensional image pickup and display apparatus according to claim 1, wherein said light reception section and said light emission section are formed on the opposite faces of the same apparatus.

8. A three-dimensional image pickup and display apparatus according to claim 1, wherein the incoming angle of light incoming to said light reception section and the outgoing angle of light outgoing from said light emission section are coordinated with each other.

9. A three-dimensional image pickup and display apparatus according to claim 1, wherein the incoming direction of light incoming to said light reception section and the outgoing angle of light outgoing from said light emission section are symmetrical to each other with respect to a normal direction to said light emission section.

10. A three-dimensional image pickup and display apparatus according to claim 1, wherein each of said first light path selection elements or said second light path selection elements is a reflecting element which drives a reflecting plate for reflecting light to vary the incoming angle of light to come to one of said light receiving elements or vary the outgoing angle of light emitted from one of said light emitting elements.

11. A three-dimensional image pickup and display apparatus according to claim 10, wherein said reflecting element is a mirror plate, a Micro-Electro-Mechanical Systems element or a digital micromirror device (trade name) driven by a piezoelectric element.

12. A three-dimensional image pickup and display apparatus according to claim 1, wherein said first light path selection elements or said second light path selection elements are driving members which carry and drive said light emitting elements to vary the directions in which light receiving faces of said light receiving elements or light emitting faces of said light emitting elements are directed.

13. A three-dimensional image pickup and display apparatus according to claim 1, wherein said first light path selection elements or said second light path selection elements are lenses disposed in front of light receiving faces of said light receiving elements or light emitting faces of said light emitting elements and drive said lenses to vary relative positions of said lenses to said light receiving elements or said light emitting elements.

14. A three-dimensional image pickup and display apparatus according to claim 1, wherein said first light path selection elements or said second light path selection elements are liquid crystal waveguides disposed in front of light receiving faces of said light receiving elements or light emitting faces of said light emitting elements and selectively vary the refractive index of liquid crystal filled in said waveguides to select transmission paths of light.

15. A three-dimensional image pickup and display apparatus according to claim 1, wherein said first light path selection elements or said second light path selection elements are Mach-Zehnder elements disposed in front of light receiving faces of said light receiving elements or light emitting faces of said light emitting elements and each selectively varies the refractive index of a phase control section provided in a light path thereof to cause interference of light to select transmission paths of light.

* * * * *